US012607551B2

(12) United States Patent
    Saadatzi

(10) Patent No.:    US 12,607,551 B2
(45) Date of Patent:        Apr. 21, 2026

(54) IMAGE CAPTURE AND AUTOMATED REGULATION OF LIQUID JET BREAKOFF FOR CELL SORTERS AND FLOW CYTOMETERS

(71) Applicant: Cytek Biosciences, Inc., Fremont, CA (US)

(72) Inventor: Mohammad N Saadatzi, Fremont, CA (US)

(73) Assignee: Cytek Biosciences, Inc., Fremont, CA (US)

( * ) Notice: Subject to any disclaimer, the term of this patent is extended or adjusted under 35 U.S.C. 154(b) by 0 days.

(21) Appl. No.: 18/797,275

(22) Filed: Aug. 7, 2024

(65) Prior Publication Data

US 2025/0208020 A1      Jun. 26, 2025

Related U.S. Application Data

(60) Provisional application No. 63/614,506, filed on Dec. 22, 2023.

(51) Int. Cl.
    G06V 10/00        (2022.01)
    G01N 15/14        (2006.01)
            (Continued)

(52) U.S. Cl.
    CPC ..... G01N 15/1434 (2013.01); G01N 15/1433 (2024.01); G01N 15/1459 (2013.01);
            (Continued)

(58) Field of Classification Search
    CPC ........... G01N 15/1434; G01N 15/1433; G01N 15/1459; G01N 2015/144; G01N 15/1404;
            (Continued)

(56) References Cited

U.S. PATENT DOCUMENTS 4,347,935 A      9/1982   Merrill
4,667,830 A      5/1987   Nozaki, Jr. et al.
            (Continued)

OTHER PUBLICATIONS

Basler AG; "Electronic Shutter Types"; https://docs.baslerweb.com/electronic-shutter-types#global-shutter; Captured Dec. 21, 2023; 6 pages.
            (Continued)

*Primary Examiner* — Frank F Huang
(74) *Attorney, Agent, or Firm* — Alford Law Group, Inc.

(57)        ABSTRACT

In one embodiment, a system includes a flow cell assembly having a flow cell body with a base having an opening allowing sheathed sample fluid to flow out, a bracket coupled to the flow cell body, a flat mirror mounted to the bracket, a hardware triggered camera coupled to the bracket on one side, and a diffused light emitting diode strobe light coupled to the bracket on an opposite side. The camera and strobe light are pointed at the mirror on opposite sides. Activation of the diffused LED strobe light generates a diffused strobe light into the mirror backlighting a droplet stream. Triggering of the camera is synchronized with the generation of the strobe light to periodically capture a brightfield still image of the droplet stream. The image can be analyzed for measured jet breakoff point and measured droplet interval point for visual feedback control of the droplet stream.

19 Claims, 24 Drawing Sheets

(51) Int. Cl.

| | |
|---|---|
| *G01N 15/1433* | (2024.01) |
| *G01N 15/1434* | (2024.01) |
| *G06V 10/25* | (2022.01) |
| *G06V 10/30* | (2022.01) |
| *G06V 10/34* | (2022.01) |
| *G06V 10/44* | (2022.01) |
| *G06V 10/762* | (2022.01) |
| *G06V 20/50* | (2022.01) |
| *H04N 23/20* | (2023.01) |
| *H04N 23/51* | (2023.01) |
| *H04N 23/54* | (2023.01) |
| *H04N 23/55* | (2023.01) |
| *H04N 23/56* | (2023.01) |
| *H04N 23/62* | (2023.01) |
| *H04N 23/74* | (2023.01) |
| *H04N 25/532* | (2023.01) |

(52) U.S. Cl.
CPC .............. *G06V 10/25* (2022.01); *G06V 10/30* (2022.01); *G06V 10/34* (2022.01); *G06V 10/44* (2022.01); *G06V 10/762* (2022.01); *G06V 20/50* (2022.01); *H04N 23/20* (2023.01); *H04N 23/51* (2023.01); *H04N 23/54* (2023.01); *H04N 23/55* (2023.01); *H04N 23/56* (2023.01); *H04N 23/62* (2023.01); *H04N 23/74* (2023.01); *H04N 25/532* (2023.01); *G01N 2015/144* (2013.01)

(58) Field of Classification Search
CPC .............. G01N 15/1425; G01N 15/147; G01N 2015/1006; G01N 15/149; G06V 10/25; G06V 10/30; G06V 10/34; G06V 10/44; G06V 10/762; G06V 20/50; H04N 23/20; H04N 23/51; H04N 23/54; H04N 23/55; H04N 23/56; H04N 23/62; H04N 23/74; H04N 25/532

See application file for complete search history.

(56) References Cited

U.S. PATENT DOCUMENTS

| | | | | |
|---|---|---|---|---|
| 6,248,590 | B1 | 6/2001 | Malachowski | |
| 7,855,078 | B2 | 12/2010 | Evans | |
| 8,436,834 | B2 * | 5/2013 | Cheng ................. | G02B 6/0001 178/18.09 |
| 8,582,860 | B2 * | 11/2013 | Malon .................. | G06T 7/0012 382/133 |
| 8,957,958 | B2 * | 2/2015 | Kuppig ................ | G02B 27/58 382/128 |
| 9,017,992 | B2 * | 4/2015 | Winther .............. | C12Q 1/6876 422/430 |
| 10,227,639 | B2 * | 3/2019 | Levner ................ | C12Q 1/6816 |
| 10,267,808 | B2 * | 4/2019 | Cai .................... | G01N 33/6872 |
| 10,453,551 | B2 * | 10/2019 | Thouppaurachchi .. | C12M 41/46 |
| 11,473,139 | B2 * | 10/2022 | Church ................ | C12Q 1/6869 |
| 2011/0216953 | A1 * | 9/2011 | Callahan ................. | C12Q 3/00 382/128 |
| 2015/0133319 | A1 * | 5/2015 | Fu ........................ | C12Q 1/6806 506/4 |
| 2016/0358326 | A1 * | 12/2016 | Sarachan .............. | G16H 30/40 |
| 2018/0012137 | A1 * | 1/2018 | Wright .............. | G05B 13/0265 |

OTHER PUBLICATIONS

Lumileds Holding BV; Luxeon IR Domed Line, product data sheet 20200403; 2020, 21 pages.

Basler AG, daA1280-54um—Basler Product Documentation; https://docs.baslerweb.com/daa1280-54um, Dec. 21, 2023, 15 pages.

* cited by examiner

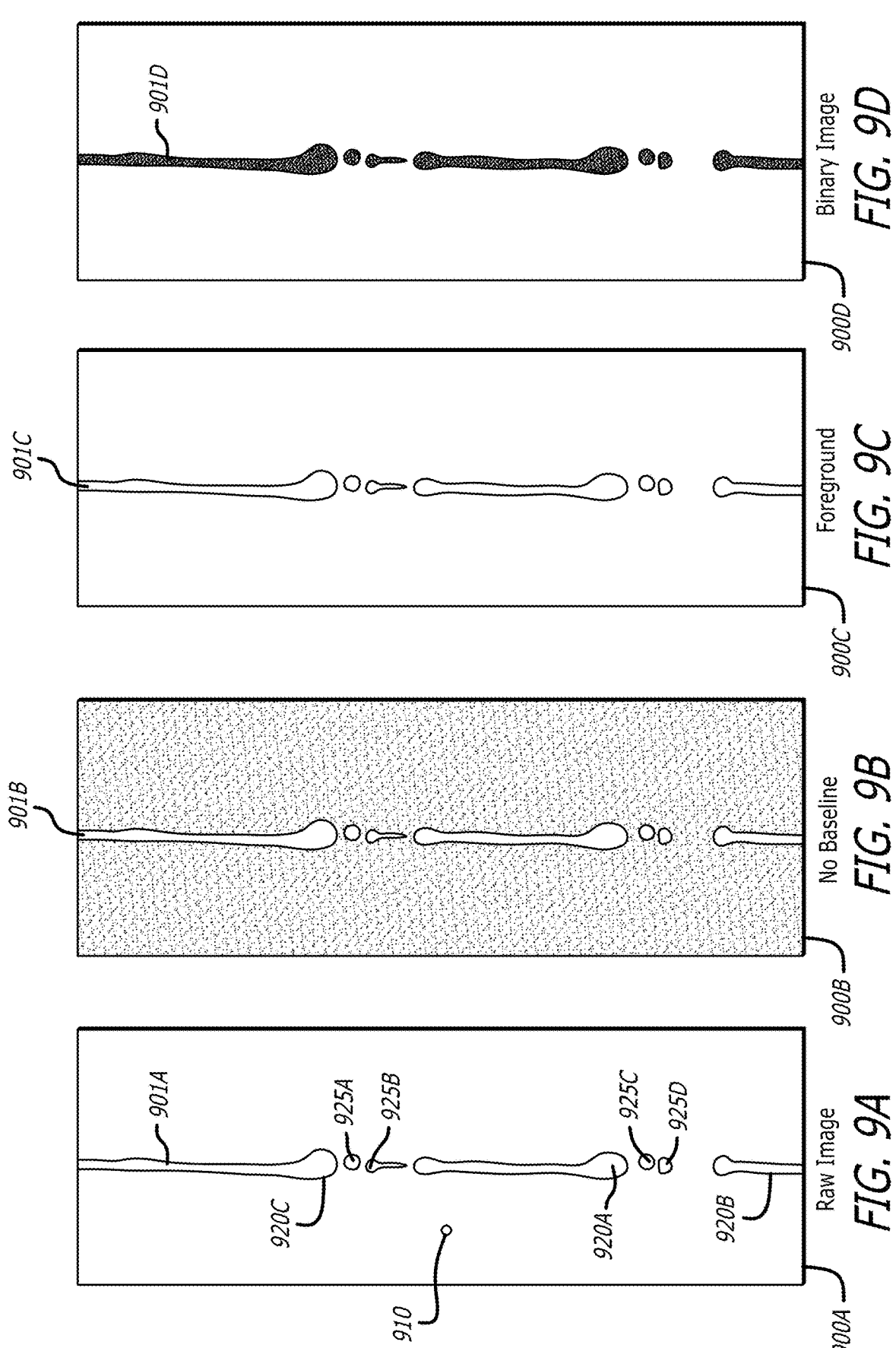

IMAGE CAPTURE AND AUTOMATED REGULATION OF LIQUID JET BREAKOFF FOR CELL SORTERS AND FLOW CYTOMETERS

CROSS-REFERENCE TO RELATED APPLICATIONS

This patent application claims priority to U.S. Provisional Patent Application No. 63/614,506 titled METHODS AND APPARATUS OF IMAGE CAPTURE AND AUTOMATED REGULATION FOR LIQUID JET BREAKOFF IN CELL SORTERS filed on Dec. 22, 2023, by inventor Mohammad N. Saadatzi, incorporated herein for all intents and purposes.

This patent application incorporates by reference U.S. patent application Ser. No. 17/665,480 titled INTEGRATED COMPACT CELL SORTER filed on Feb. 4, 2022, by inventors Glen Krueger et al., for all intents and purposes. The terminology of this application is controlling over that used in application Ser. No. 17/665,480 should there be any conflicts.

FIELD

The disclosed embodiments relate generally to sorting flow cytometers and cell sorter systems.

BACKGROUND

Flow cytometry and cell sorting involves the optical measurement of cells or particles of a test sample carried in a fluid flow. While a flow cytometer detects information about biological cells and particles, a cell sorter further sorts out selected cells of interest into different containers (e.g., test tubes) for further usage (e.g., testing) or counting. A cell sorter can also be referred to as a sorting flow cytometer.

A cell sorter selectively charges droplets of flowing biological sells encapsulated by sheath fluid positive or negative that are desired to be sorted out from a waste stream. To deflect the charged droplets with biological cells off of a center stream into a left or a right stream, an electrostatic field is applied. If a biological cell is to be discarded, the droplet containing it is not charged. With an uncharged droplet, the electrostatic field does not deflect the droplet so that it remains in the center stream to fall into a waste bucket.

To properly charge and sort droplets, the breakoff of droplets from a jet stream and the droplet formation process is a key aspect. Until a droplet breaks off from the jet stream it can be charged. Accordingly, the better controlled the droplet formation, the better is the selective sorting of droplets. In the droplet formation process, it is desirable to regulate the location of the jet breakoff and relative distance of the formed droplets to that location in order to accurately charge the selected droplets, before selection by electrostatic deflection. It is desirable to accurately control the droplet formation process and jet breakoff location over that of manual settings that are usually set once and forgotten. Generally, it is desirable to improve droplet formation, consistency of jet breakoff, and the sorting process over prior cell sorting systems.

SUMMARY

The embodiments can be best summarized by the claims. However, a summary of some of the embodiments is provided here.

In some aspects, the techniques described herein relate to a flow cytometer or cell sorter system, the system including: a fluidics system under pressure to cause a sheath fluid and a sample fluid with cells or particles to flow; a flow cell assembly coupled in communication with the fluidics system to receive the sheath fluid and the sample fluid, the flow cell assembly including a flow cell body to surround the sample fluid with the sheath fluid to form a sheathed sample fluid, wherein the flow cell body has a base with a circular opening to allow a stream of the sheathed sample fluid to flow out and subsequently form a droplet stream along a fluid axis; a center bracket coupled to the flow cell body of the flow cell assembly; a flat mirror mounted to the center bracket below and in parallel with a backside of the flow cell body; a hardware triggered camera on one side of the flow cell body coupled to the center bracket, the hardware triggered camera pointed at the flat mirror on a first angle with a plane surface of the flat mirror; and a diffused light emitting diode (LED) strobe light on an opposite side of the flow cell body coupled to the center bracket, the diffused LED strobe light pointed at the flat mirror on a second angle with the plane surface of the flat mirror; wherein an activation of the diffused LED strobe light generates a diffused strobe light into the flat mirror backlighting the droplet stream that is synchronized with a triggering of the hardware triggered camera to periodically capture a brightfield still image of a portion of the droplet stream along the fluid axis below the flow cell body.

In some aspects, the techniques described herein relate to a method for a flow cytometer or a cell sorter system, the method including: capturing a raw brightfield still image of a droplet stream along a fluid axis with a diffused backlighting provided by a synchronized diffused strobe lighting; image processing the raw brightfield still image to provide a noiseless binary image of the droplet stream; identifying connected components in the noiseless binary image of the droplet stream, the identified connected components including a jet stream and one or more droplets in the droplet stream; extracting morphological features of the connected components in noiseless binary image of the droplet stream; clustering similar connected components together in the noiseless binary image of the droplet stream based on the extracted morphological features of the connected components; and determining a measured jet breakoff point in the binary image of the droplet stream.

In some aspects, the techniques described herein relate to a method for a flow cytometer or a cell sorter system, the method including: capturing a raw brightfield still image of a droplet stream along a fluid axis with a diffused infrared backlighting provided by a synchronized diffused strobe lighting; image processing the raw brightfield still image to provide a noiseless binary image of the droplet stream; determining a measured jet breakoff point in the binary image of the droplet stream; comparing the measure jet breakoff point with a desired jet breakoff point to determine a jet breakoff error; and based on the jet breakoff error, adjusting an amplitude in an alternating current (AC) waveform signal that drives a piezo-electric device to vibrate and cause a sample fluid to form one or more droplets in the droplet stream.

In some aspects, the techniques described herein relate to a droplet control system for a flow cytometer or cell sorter, the droplet control system including: a waveform synthesizer to generate an alternating current (AC) waveform signal at a selected frequency; a variable gain amplifier coupled to the waveform synthesizer, the variable gain amplifier modifying an amplitude of the AC waveform signal based on a gain signal to form a variable gain AC waveform signal; a high voltage amplifier coupled to the variable gain amplifier to receive the variable gain AC waveform signal, the high voltage amplifier having a constant gain to increase the amplitude of the variable gain AC waveform signal into a high voltage AC waveform signal; a piezo-electric device coupled to the high voltage amplifier to receive the high voltage AC waveform signal and vibrate a sheathed sample fluid to form one or more droplets in a droplet stream; a diffused light emitting diode (LED) strobe light to periodically generate a diffused infrared backlighting for the droplet stream synchronized with the AC waveform signal; a hardware triggered camera to periodically capture a brightfield still image of the droplet stream in synchronous with periodic generation of the diffused infrared backlighting by the diffused LED strobe light; and an image processor coupled in communication with the variable gain amplifier and the hardware triggered camera, the image processor to receive the brightfield still image of the droplet stream from the hardware triggered camera, the image processor further receiving a selected jet breakoff point and a selected droplet interval, the image processor to process the brightfield still image of the droplet stream to determine a measured jet breakoff point and compare the measured jet breakoff point with the selected jet breakoff point to determine a jet breakoff error and generate the gain signal to vary the amplitude of the variable gain AC waveform signal to correct for the jet breakoff error.

In some aspects, the techniques described herein relate to an apparatus for controlling a droplet stream, the apparatus including: a storage device to store instructions for execution; a processor coupled to the storage device to execute the instructions stored in the storage device, and a display device coupled in communication with the processor, the display device to display a graphical user interface (GUI) generated by the processor executing instructions including a droplet stream control GUI, the display device displaying the droplet stream control GUI including: a plurality of droplet stream image windows; and one or more control input windows below the plurality of droplet stream image windows, wherein at least one of the one or more control input windows is an active monitoring control input window to receive a user selected jet breakoff point control input, a user selected droplet interval or gap control input, and a user selected activate monitoring control box.

BRIEF DESCRIPTION OF THE DRAWINGS

Various embodiments are illustrated by way of example, and not by way of limitation, in the Figures of the accompanying drawings.

FIGS. 9A-9D are images of image processing of a droplet stream with droplets and satellites.

5

FIGS. 18A-18D are views of waveform charts over the same time axis of the variable jet breakoff point, droplet interval point, droplet center point, and amplitude of the piezo drive signal generated by the droplet control system that drives the piezo-electric device to form the droplet stream.

It will be recognized that some or all of the Figures are for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION

In the following detailed description of the embodiments, numerous specific details are set forth. However, it will be obvious to one skilled in the art that the embodiments may be practiced without these specific details. In other instances, well-known methods, procedures, components, and circuits have not been described in detail so as not to unnecessarily obscure aspects of the embodiments. The various sections of this description are provided for organizational purposes. However, many details and advantages apply across multiple sections.

Generally, a droplet stream can include a jet stream, one or more droplets, and, potentially, one or more satellites along the same fluid axis. A droplet generally includes a biological cell or some other sort of particle (e.g., a bead) or particles. Droplet formation (also referred to as capillary jet breakup) somewhat takes place due to competing gravity and surface tension forces. When the gravity force exceeds the attaching surface tension force, a liquid is pulled in the form of a long thread, that can further lead to necking and breakup resulting in the formation of a droplet. Gravitational force is significant in case of large droplets and less significant for satellites. Satellites are formed by the breakup of the ligament that connects two droplets, or one droplet to the jet stream.

System Overview

Figure 1:
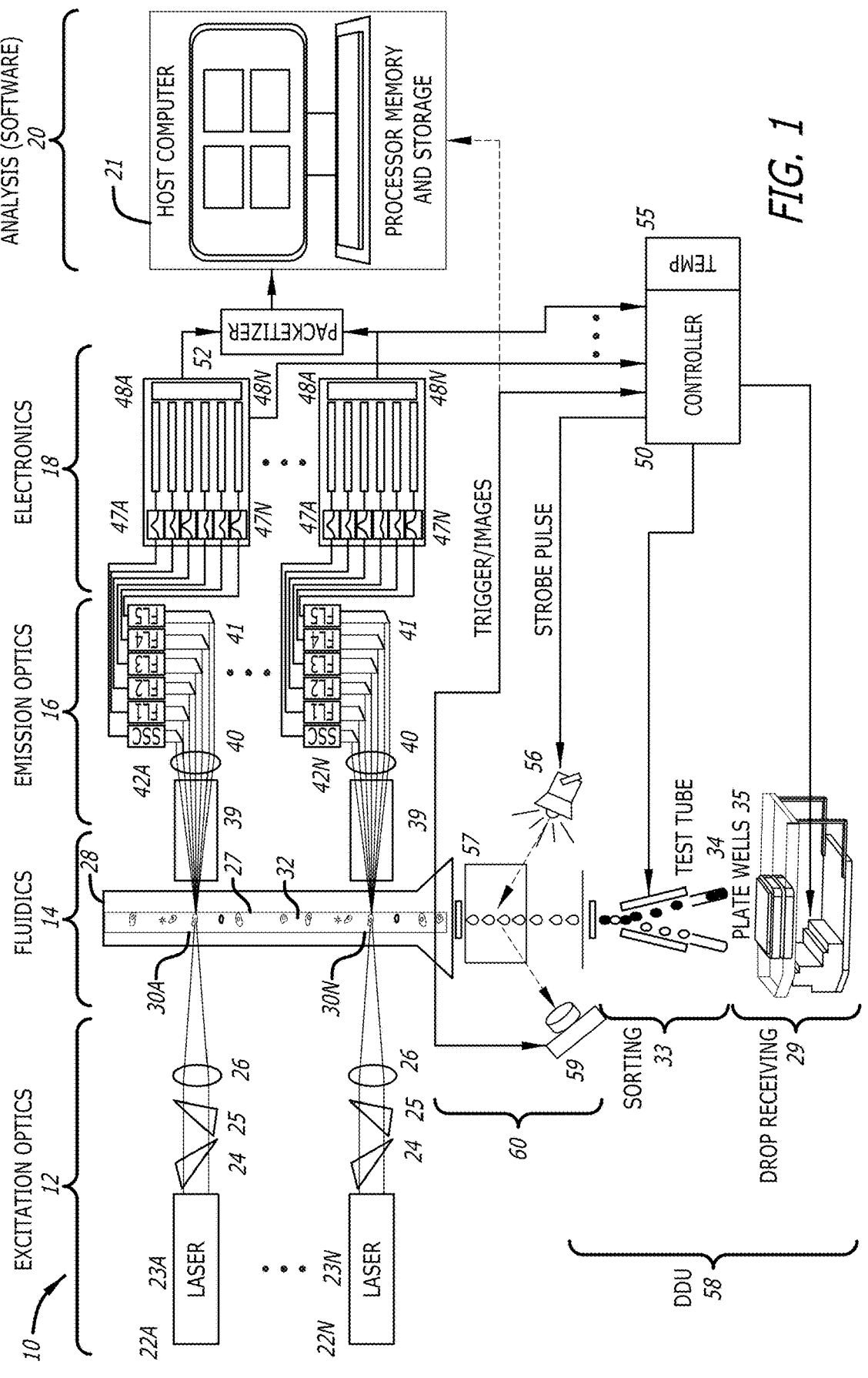
FIG. 1 is a basic conceptual diagram of a cell sorter system (a sorting flow cytometer system), and a flow cytometer system is shown.

FIG. 1 is a basic conceptual diagram of a cell sorter system (sorting flow cytometer) 10. A standard flow cytometer can exclude sorting elements of the cell sorter system. In FIG. 1, five major subsystems of the system 10 are shown including an excitation optics system 12, a fluidics system 14, an emission optics system 16, an acquisition system 18, and an analysis system 20. The fluidics system 14 can include a sample loading system (not shown), an interrogating system 28, a cell sorting system 33, and a drop receiving system 29. Generally, a "system" and "subsystem" includes (electrical, mechanical, and electro-mechanical) hardware devices, software devices, or a combination thereof.

The excitation optics system 12 includes, for example, a plurality (e.g., two to five) of excitation channels 22A-22N each having a different laser device 23A-23N and one or more optical elements 24-26 to direct the different laser light to optical interrogation regions 30A-30N spaced apart along a line in a flow channel 27 of a flow cell 28. Example optical elements of the one or more one or more optical elements 24-26 include an optical prism and an optical lens. The excitation optics system 12 illuminates an optical interrogation region 30 in a flow cell 28. The fluidics system 14 carries a fluid sample 32 surrounded by a sheath fluid through each of a plurality of optical interrogation regions 30A-30N in the flow cell/flow channel.

The emission optics system 16 includes a plurality of detector arrays 42A-42N each of which, for example, includes one or more optical elements 40, such as an optical fiber and one or more lenses to direct fluorescent light and/or (forward, side, back) scattered light to various electro-optical detectors (transducers), including a side scatter (SSC) channel detector and a plurality (e.g., 16, 32, 48, 64) of fluorescent wavelength range optical detectors in each array, such as a first fluorescent optical detector (FL1) receiving a first wavelength range of fluorescent light, a second fluorescent optical detector (FL2) receiving a second wavelength range of fluorescent light, a third fluorescent optical detector (FL3) receiving a third wavelength range of fluorescent light, a fourth fluorescent optical detector (FL4) receiving a fourth wavelength range of fluorescent light, a fifth fluorescent optical detector (FL5) receiving a fifth wavelength range of fluorescent light, and so on to an Nth fluorescent optical detector (FLN) receiving an Nth wavelength range of fluorescent light. Each of the detector arrays 42A-42N receives light corresponding to the cells/particles that are struck and/or one or more fluorescent dyes that attached thereto and excited by the differing laser light in interrogation regions/points 30A-30N along the flow channel 27 of the flow cell 28 by each of the corresponding plurality of lasers 23A-23N. The emission optics system 16 gathers photons emitted or scattered from passing cells/particles and/or a fluorescent dyes attached to the cells/particles. The emission optics system 16 directs and focuses these collected photons onto the electro-optical detectors SSC, FL1, FL2, FL3, FL4, and FL5 in each detector array, such as by fiber optic (optical fibre) cables 39, one or more one or more lenses 40, and one or more mirrors/filters 41. Electro-optical detector SSC is a side scatter channel detector detecting light that scatters off the cell/particle. The electro-optical detectors FL1, FL2, FL3, FL4, and FL5 are fluorescent detectors may include band-pass, or long-pass, filters to detect a particular and differing fluorescence wavelength ranges from the different fluorescent dyes excited by the different lasers. Each electro-optical detector converts photons into electrical pulses and sends the electrical pulses to the acquisition (electronics) system 18.

For each detector array 42A-42N, the acquisition (electronics) system 18 includes one or more analog to digital converters 47A-47N and one or more digital storage devices 48A-48N that can provide a plurality of detector channels (e.g., 16, 32, 48 or 64 channels) of spectral data signals. The spectral data signals can be signal processed (e.g., digitized by the A/Ds) and time stamped, and packeted together by a packetizer 52 into a data packet corresponding to each cell/particle in the sample). These data packets for each cell/particle can be sent by the acquisition (electronics) system 18 to the analysis system 20 for further signal processing (e.g., converted/transformed from time domain to wavelength domain) and overall analysis. Alternatively, or conjunctively, time stamped digital spectral data signals from each channel that is detected can be directly sent to the analysis system 20 for signal processing.

The system 10 includes a liquid jet breakoff control system 60 including one or more controllers/processors 50. The liquid jet breakoff control system 60 further includes an LED strobe (flash) light array 56, a flat mirror 57, and a hardware triggered camera 59. One controller/processor can control the sorting 33 with the sorting plates 35 in order to move the droplets from a center stream into one of two side streams into containers, such as test tubes 34 or wells of well plate 34. The center stream is a waste stream into which non-sorted material falls. The periodic strobe light from the LED strobe 56 is focused on a point in the mirror so the droplet stream (including fluid jet, droplets, and satellites) out from the flow cell 28 is backlit by the reflected strobe light. The backlighting allows the hardware triggered camera 59 to periodically capture brightfield still images of the fluid jet, droplets, and satellites in the droplet stream in response to a selective image capture signal (digital trigger signal or global shutter trigger signal) in synchrony with the piezoelectric actuator's excitation signal. The camera 59 is a hardware-triggered camera that quickly responds to the selective image capture (shutter) signal to begin and end image capture by the plurality of camera pixels on a camera chip of the hardware triggered camera. One controller/processor can perform synchronization of a strobe signal and a shutter signal to synchronously control the LED strobe light 56 and the hardware-triggered camera 59. The images captured by the camera can be sent to another controller/processor 50 to perform image processing and morphology analysis of the droplet stream in the image using machine learning and computer vision algorithms. Alternatively, the images captured by the camera can be sent to a computer 21 with a processor executing analysis software 20 to perform image processing and morphology analysis of the droplet stream in the captured image.

Figure 2A:
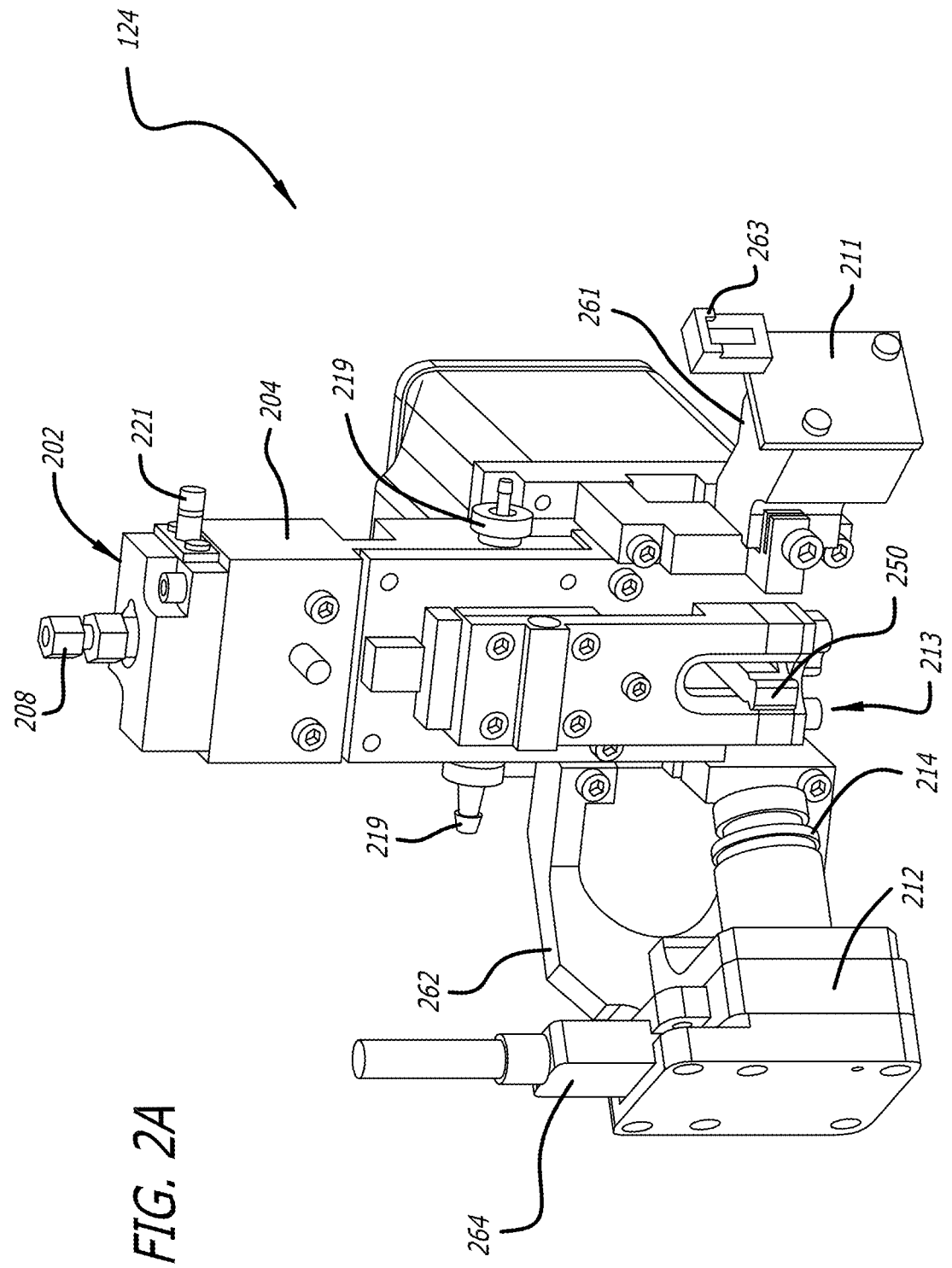
FIG. 2A is a front perspective view of components in a flow cell of a cell sorter/flow cytometer system.
Figures 16A, 16B:
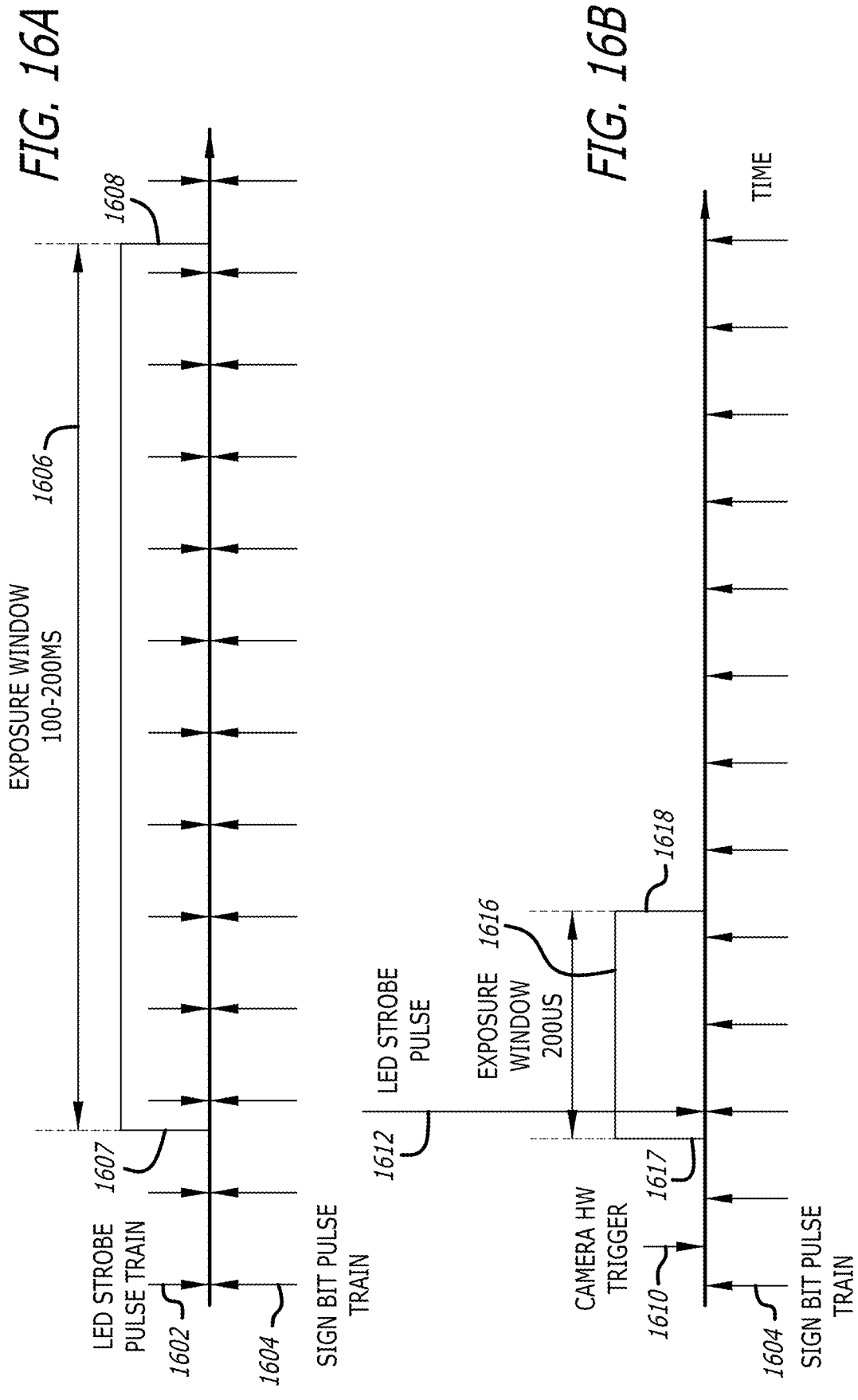
FIG. 16A illustrates an exposure time window for a conventional LED strobe light and a conventional software triggered camera.
FIG. 16B illustrates an exposure time window for a synchronized diffused light emitting diode (LED) strobe light and a hardware triggered camera.

As explained further herein, the LED strobe 56 has a plurality of infrared (IR) light emitting diodes emitting infrared light and a diffuser in front of the light emitting diodes (LEDs) in response to the selective strobe pulse signal (see LED strobe pulse signal 1612 in FIG. 16B and the LED electrical connector 263 that includes the wire for the strobe pulse signal in FIG. 2A). The use of IR light avoids interference with other optical components and equipment in the flow cytometer/cell sorter. The diffuser uniformly disperses the white light and spreads it more evenly over the reflective flat mirror 57 to provide improved backlighting. Assuming the same number, type, wattage, color, and position of LEDs, without a diffuser, the LED bulbs of the strobe light are more like round spot lights focused at the mirror 57. There is a limited space in the flow cytometer/cell sorter and the position of the mirror constrains the optical axis and the number of LEDs that can be used for the LED strobe 56 to provide the backlighting of the drops with the biological cells/particles.

The analysis system 20 includes a host computer 21 with a display device, a processor, memory, and data storage devices coupled in communication together. The data storage devices can store the data packets of timestamped digital spectral data associated with the detected cells/particles in the sample. The analysis system 20 further includes software with instructions executed by the processor to convert/transform data from the time domain to data in a wavelength/frequency domain and stitch/merge data together to provide an overall spectrum for the cell/particle/dyes excited by the different lasers and sensed by the detector arrays. With detection of the type of cell/particle through the one or more fluorescent dyes attached thereto, a count of the cells/particles can be made in a sample processed by a flow cytometer and/or cell sorter. The data storage devices and memory can also store instructions for execution by the processor. Graphical user interfaces (GUI) can be generated by the processor based on execution of some instructions and then displayed on the display device. A droplet stream control GUI can be displayed on the display device by instructions executed by the processor.

In some cases, it is desirable to sort out the cells in a sample for further analysis with a cell sorter (sorting flow cytometer). Accordingly, the spectral data signals can also be processed by a real-time sort controller 50 in the acquisition (electronics) system 18 and used to control a sorting system 33 to sort cells or particles into one or more test tubes 34. In which case, the sorting system 33 is in communication with the real-time sort controller 50 of the acquisition (electronics) system 18 to receive control signals. Instead of test tubes 34, the spectral data signals can also be processed by the real-time sort controller 50 of the acquisition (electronics) system 18 and used to control both the sorting system 33 and a droplet deposition system 29 to sort cells or particles into wells 35 of a moving capture tray/plate. In which case, both the droplet deposition system 29 and the sorting system 33 are in communication with the acquisition (electronics) system 18 to receive control signals. In an alternate embodiment, the analysis system 20 can generate these control signals from analyzing the spectral data signals in order to sort out different cells/molecules and control the sorting system 33 and the droplet deposition system 29 to capture the droplets of samples with cells/particles into one or more wells 35 of the plurality of wells in the capture tray/plate.

U.S. patent application Ser. No. 15/817,277 titled FLOW CYTOMETERY SYSTEM WITH STEPPER FLOW CONTROL VALVE filed by David Vrane on Nov. 19, 2017, now issued as U.S. Pat. No. 10,871,438; U.S. patent application Ser. No. 15/659,610 titled COMPACT DETECTION MODULE FOR FLOW CYTOMETERS filed by Ming Yan et al. on Jul. 25, 2017; and U.S. patent application Ser. No. 15/942,430 COMPACT MULTI-COLOR FLOW CYTOMETER HAVING COMPACT DETECTION MODULE filed by Ming Yan et al. on Mar. 30, 2018, each of which disclose exemplary flow cytometer systems and subsystems all of which are incorporated herein by reference for all intents and purposes. U.S. Pat. No. 9,934,511 titled RAPID SINGLE CELL BASED PARALLEL BIOLOGICAL CELL SORTER issued to Wenbin Jiang on Jun. 19, 2016, discloses a cell sorter system that is incorporated herein by reference for all intents and purposes.

Flow Cell Assembly

Figures 3A, 3B:
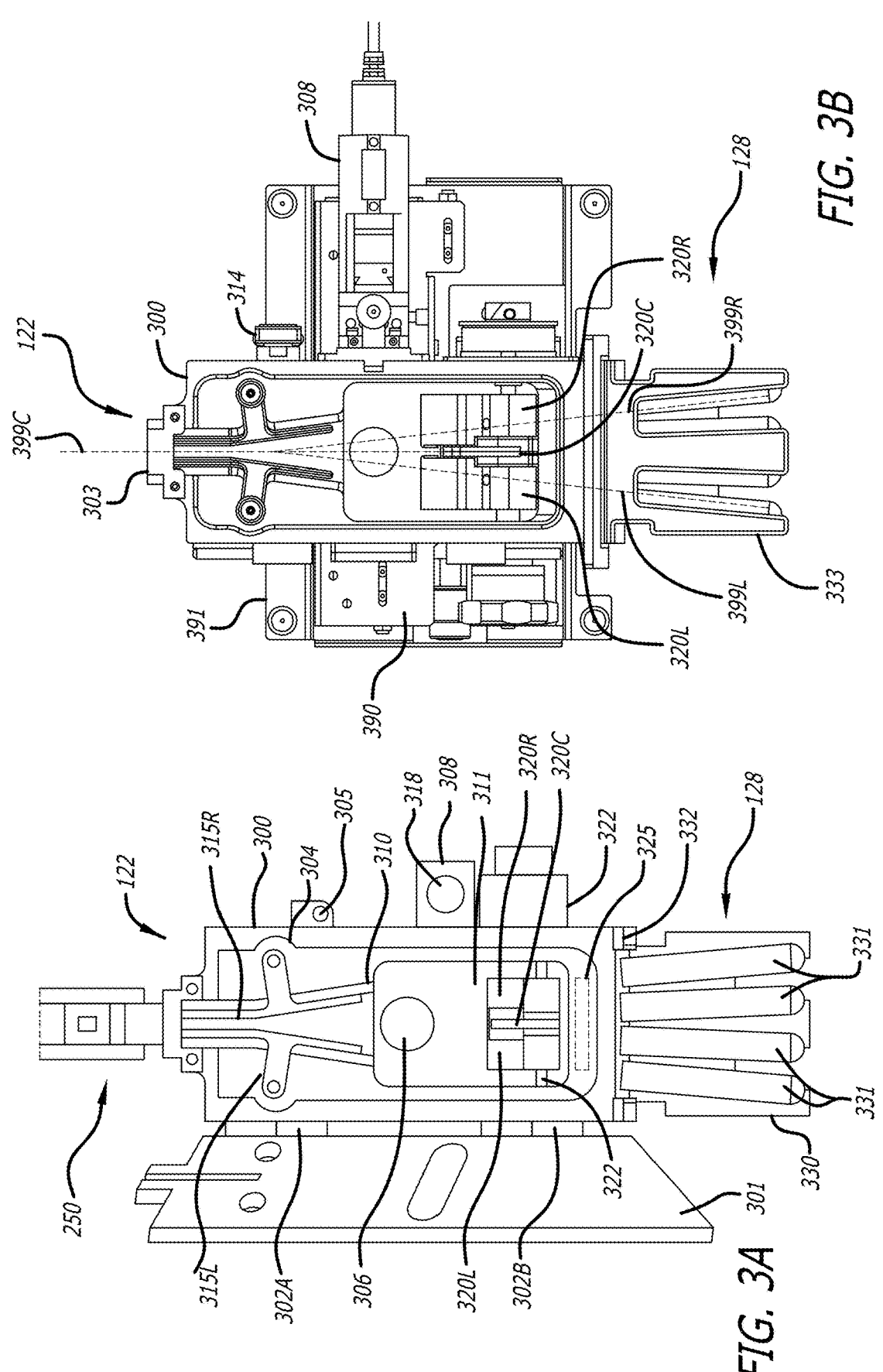
FIG. 3A is a front view of the deflection chamber, with covered removed, of the sorting system of the compact cell sorter system.
FIG. 3B is a front view of the deflection unit, with covered removed, in the compact cell sorter system illustrating three possible droplet stream axes.

FIG. 2A illustrates a front perspective view of a flow cell assembly 124 of a flow cytometer/cell sorter. The flow cell is coupled in communication with a fluidics subsystem to receive a sheath fluid. A sample biological fluid received at the top of the flow cell flows with cells or particles through the flow cell to be surrounded by the sheath fluid. A deflection unit 122 shown in FIGS. 3A-3B is under the flow cell assembly 124 to receive the droplets of the sample biological fluid and sheath fluid. The deflection unit 122 selectively deflects one or more charged droplets away from the center stream path along one or more deflection paths. A droplet deposition unit (DDU) chamber/system is in communication with the deflection unit 122 to selectively receive deflected droplets in the stream of the sample biological fluid with the one or more biological cells or particles into one or more containers such as test tubes or wells of a plate.

Figure 2B:
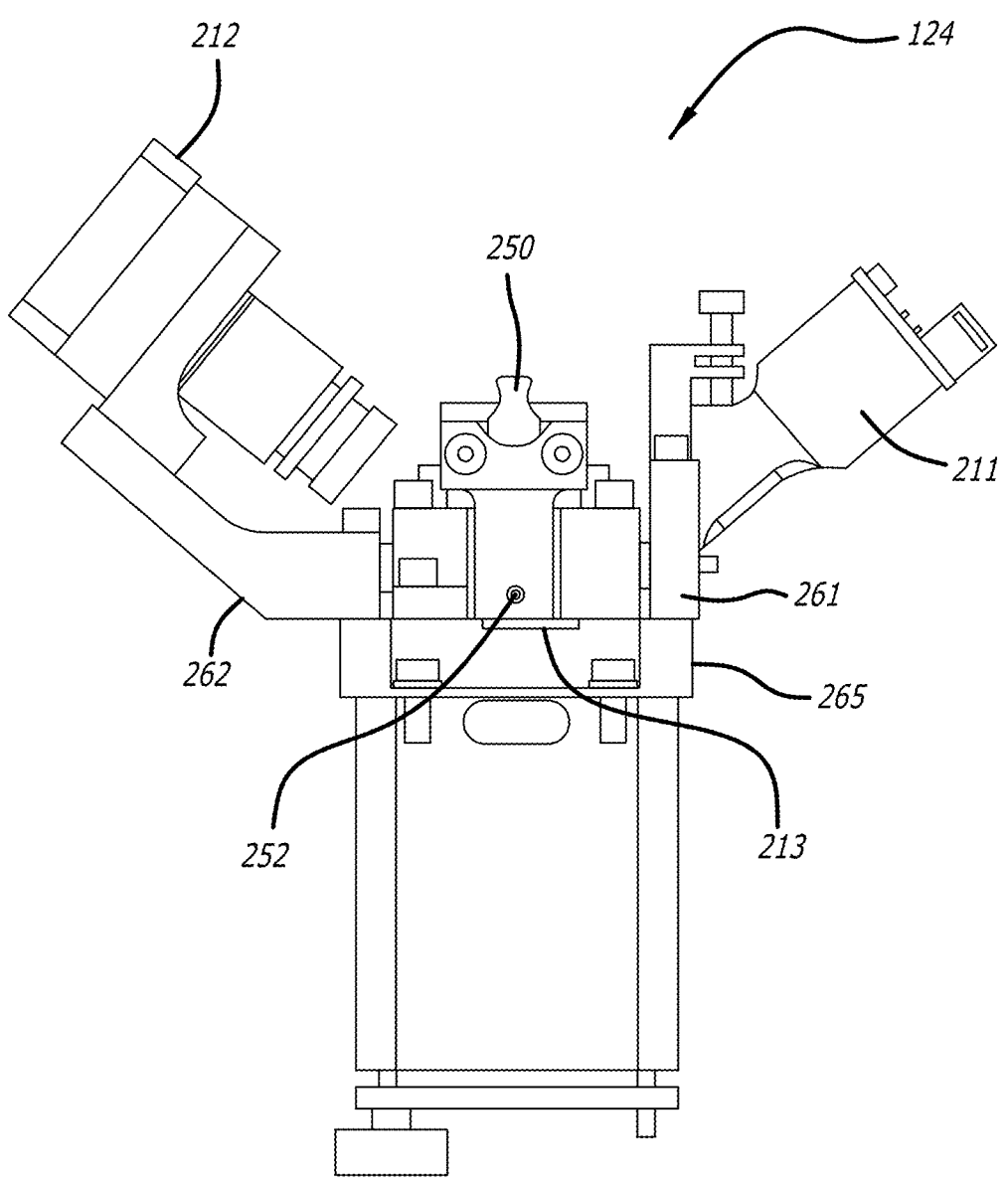
FIG. 2B is a bottom view of the components in the flow cell of a cell sorter/flow cytometer system shown in FIG. 2A to better show the relationship of a flat mirror with regards to the nozzle orifice of the removable nozzle.

FIGS. 2A-2B illustrate various components of a flow cell assembly 124 without nozzle carriage assembly, its mechanical linkage, and other components that otherwise obscure details that are now discussed. A forward scatter assembly, a final focus lens, and its adjustment are also not shown to avoid obscuring details. The flow cell assembly 124 includes a flow cell body 204, a drop drive assembly 202, a cuvette 206, a linkage assembly (not shown), a carriage assembly (not shown), and a nozzle assembly 250 with a nozzle having an orifice 252. The drop drive assembly 202 has a sample input port 208 to receive a hose or pipe that carries the sample fluid. The drop drive assembly 202 further has a sheath input/output ports 218,219 coupled to the flow cell body 204. Each of sheath input/output ports 218,219 can receive a hose or pipe. The sheath input port 218 can carry sheath fluid into flow cell and the sheath drain (output) port 219 can carry excess sheath fluid away from the flow cell. The drop drive assembly 202 is coupled into the flow cell body 204. The drop drive assembly 202 further includes a sample injection tube 222, as shown in FIG. 4B, that directs the sheathed sample fluid towards the orifice 252 in the nozzle body of the nozzle assembly 250 to form droplets of the sample fluid wrapped in a sheath fluid. A piezo drive cable is coupled to the connector 221 to actuate piezo electric device (see FIG. 4B) around the sample injection tube 222.

The flow cell assembly 124 has a number of optical, electrical, and electro-optic components including a hardware triggered digital camera 212, a strobe light assembly (diffused light emitting diode (LED) strobe light) 211, and a reflective flat mirror 213 for capturing droplet stream images. The hardware triggered digital camera 212 is a digital still camera coupled to the flow cell body 204 by a camera mount to hold it in alignment with a camera axis from a point on the flat mirror 213. The hardware triggered digital camera 212 is equipped with a global shutter that can be triggered by a camera digital trigger signal input or shutter signal input. The hardware triggered digital camera 212 further has one or more camera lenses 214 to focus at a point on the axis of droplet stream in front of the flat mirror 213. The camera 212 further has a camera cable 264 to couple a camera digital trigger signal into the camera hardware and receive image data in return over data signal lines. Instead of being triggered by software timers, the camera 212 is a hardware-triggered camera and has a hardware signal input to receive the camera digital trigger signal to activate (e.g., on a rising edge to a high pulse level) and deactivate (e.g., on a negative edge to a low pulse level) the capture of digital images like a shutter.

The diffused LED strobe light 211 is coupled to the flow cell body 204 by an illumination mount 261 to hold it in alignment with a strobe light axis into the flat mirror 213 at a point. As discussed herein, the diffused LED strobe light 211 includes an optical diffuser to spread out the LED strobe light into a diffused strobe light directed towards the flat mirror 213. The diffused LED strobe light 211 has an electrical connector (LED IO connector) 263 to receive a strobe trigger signal and control the strobe light generated by the LED bulbs. The optical axes of the diffused LED strobe light 211 and the camera 212 are at a same angle with the face of the flat mirror 213.

In FIG. 2B, a bottom view of the flow cell assembly 124 is shown. The flat mirror 213 is placed behind the nozzle assembly 250 with a nozzle having an orifice so the strobe light generated by the diffused LED strobe light 211 is reflected by the flat mirror 213 and backlights the droplet stream exiting out of the orifice (circular opening) of the nozzle assembly of the flow cell. The camera 212 focuses and captures a brightfield still image of the droplet stream exiting out of the orifice of the nozzle assembly. The flow cell assembly 124 has a center bracket 265 to keep the camera 212, the diffused LED strobe light 211, the flat mirror 213, and the flow cell body 204 aligned together to consistently capture droplet stream images from the same position. The camera mount (first mounting bracket) 262 is coupled to and between the camera 212 and the center bracket 265 on one side. The illumination mount (second mounting bracket) 261 is coupled to and between the diffused LED strobe light 211 and the center bracket 265 on the opposite side. The flat mirror 213 is mounted to the center bracket 265 in the middle between left and right sides to receive the strobe light from the diffused LED strobe light 211 and reflect it towards the droplet stream falling out of the orifice 252 and the hardware triggered digital camera 212.

Laser light from one or more lasers is sent into one or more interrogation regions in the flow channel of a cuvette to excite flowing cells/particles and/or one or more fluorescent dye markers attached thereto that pass by. The flow cell assembly 124 further includes one or more objective lenses in order to capture light (e.g., reflected light, scattered light, fluorescent light) from the cells/particles and/or the one or more fluorescent dyes attached to the cells/particles on one side. The one or more objective lenses can also launch the captured light into a fiber optic cable, so it is directed to detectors to analyze the cells and determine their characteristics prior to sorting.

Deflection Chamber for Sorting

The nozzle, in the nozzle assembly of the flow cell, breaks up the sheathed sample fluid into droplets. The droplets with cells of interest in a center stream are sorted out by deflecting droplets away from the center stream. The droplets are charged so they can be deflected away from the center stream by charged deflecting plates in the deflection chamber (unit) 122. The droplets with cells of interest can be collected into separate vessels (test tubes, wells) by the DDU for further testing in a lab.

FIGS. 3A-3B illustrate the deflection unit 122 under the nozzle assembly 250 of the flow cell assembly 124. Accordingly, the deflection unit is in communication with the flow cell assembly 124 to receive a plurality of droplets of the sheathed sample biological fluid that are in a center stream. The back of the deflection unit 122 is mounted to a rail so that it can be horizontally adjusted from side to side.

The deflection unit 122 includes a case 300 with a door 301 pivotally coupled to the case by a plurality of hinges 302A-302B. The door 301 includes a fastener (e.g., a catch) that can engage a latch to keep the door securely closed against the case. The case 300 has a deflection cone cutout 310 that opens up into a deflection chamber 311. A seal 304 is in a channel around the deflection cone cutout 310 and the deflection chamber 311 to which the door 301 presses against. This seals the sample droplets within the cutout and chamber, so they are not released into ambient air.

A left electrostatic charge (deflection) plate 315L and a right electrostatic charge (deflection) plate 315R are mounted in the deflection cone cutout 310 and are progressively separated further from each other from top to bottom in the cone. A left high voltage charge is applied to the left electrostatic charge plate 315L, and a right high voltage charge of opposite polarity is applied to the right electrostatic charge plate 315R to impose an electrostatic field through which droplets pass. If a droplet is to be sorted by moving it away from a center stream of droplets, a positive charge or a negative charge is synchronously applied to the sample stream by the conductive hose fitting in the drain/charge port and a charge signal from the sort controller before it breaks off from the stream as a droplet. After one droplet breaks off from the stream with one charge, the next droplet that breaks off from the stream can be differently charged through the stream. If the droplets are uncharged (grounded), they remain in the center stream. If a droplet is charged by applying a charge signal (positive or negative) to the charge port on the flow cell, it can be deflected as it passes through the electrostatic field formed by the electrostatic charge plates. The degree of deflection depends on both the magnitude of the electrostatic field imparted by the left and right electrostatic charge plates and the polarity and magnitude of the charge imparted to the droplet by the charge port.

For example, the left electrostatic charge plate may be charged at negative 2000 Volts and the right electrostatic charge plate may be charged at positive 2000 volts to provide a 4000 volt electrostatic field between them. The voltages on the electrostatic charge plates are held constant during a sort of droplets in a sample. Droplets then may be selectively charged instantaneously (by applying charge to the conductive hose fitting in the charge/drain port on the flow cell) to achieve a desired deflection away from center. Accordingly, the precise magnitude and polarity of voltage applied to cells associated with each stream path will depend on the desired direction and magnitude of deflection needed to get the droplet into a receiving receptacle. Accordingly, multiple (e.g., 2, 3, 4, 5, 6) left deflected stream paths and multiple (e.g., 2, 3, 4, 5, 6) right deflected stream paths can be formed about the center stream path. For simplicity of the explanation herein, we will collectively refer to them herein as a left stream path (left stream) and a right stream path (right stream).

A backside of the case 300 has a side laser window and a stream camera window 306. A side laser light generated by a laser 308 is directed into the deflection chamber 311 through the side laser window. The position of the laser 308 behind the side laser window can be adjusted by the laser position adjuster 318. The side laser light is adjusted front to back to strike the droplets with the sample biological cells to sense the path position of the droplets. A stream camera 307 is mounted outside the case in line with and behind the stream camera window 306 to view the droplets and determine whether or not they are in a center stream path, a left deflected stream path, or a right deflected stream path. The stream camera 307 provides a feedback mechanism to the sort controller to be sure the charges on the charge plates are appropriate for deflection of droplets into the left deflected stream path and the right deflected stream path, as well as equally charged (or no charge) for dropping in the center stream path inside the deflection unit 122.

At the base of the deflection chamber 311 is an aspirator well (tub) with a drain to aspirate droplets and satellites into the waste line out of the cell sorter. In front and below the tub in the base of the deflection chamber is a horizontal drop slot 325. Inside the chamber 311, a left pivotal side stream scupper 320L, a center non-pivotal aspirator (collector) 320C, and a right pivotal side stream scupper 320R are mounted along a drive shaft in the tub of the deflection chamber. The center non-pivotal aspirator (collector) 320C is around the drive shaft between the left and right pivotal sidestream scuppers but is undriven by the drive shaft. The left pivotal sidestream scupper and the right pivotal sidestream scupper pivot with the drive shaft between a raised position and a lowered position. The center non-pivotal aspirator (collector) 320C is non-pivotal and remains in a fixed rotational position regardless but is free to move left and right with the scuppers. Droplets that are deflected and not captured by the side stream scuppers 320L-320R or the center non-pivotal aspirator 320C can fall out of the deflection unit 122 through the horizontal drop slot 325.

With no deflection by the deflection plates, the center stream of droplets and satellites from the nozzle assembly drop through the deflection cone cutout 310 into the deflection chamber 311 and are caught by the center non-pivotal aspirator 320C. The center non-pivotal aspirator 320C and the side stream scuppers 320L-320R, when in the lowered position, act somewhat like rain gutters directing the flow of droplets of sample fluid. The center non-pivotal aspirator 320C directs the droplets and satellites it catches into the tub for aspiration down the drain as waste. In a lowered position, the left and right pivotal side stream scuppers 320L-320R catch droplets that are deflected away from the center stream and direct the droplets they catch by means of a tunnel into the tub for aspiration down a drain as waste. The droplets in the tub can be aspirated down the drain and out through a waste port by a vacuum.

In a raised position, the left and right pivotal side stream scuppers 320L-320R do not catch any droplets. When left and right pivotal sidestream scuppers are in the raised position and selected droplets are deflected away from the center stream as deflected droplets, those deflected droplets of sample fluid drop past the sidestream scuppers and through the horizontal drop slot 325 in the base of the case 300. The deflected droplets pass through the horizontal drop slot 325 for collection in a chamber with a well plate or test tubes below the deflection unit 122.

In the case of an urgent sorter shutdown, the sorter can pivot the shaft and the sidestream scuppers into the lowered position such that they and the center non-pivotal aspirator 320C catch all of the droplet stream (jet stream, droplets, and satellites) of sheathed sample fluid formed by the nozzle assembly 250, whether deflected or not, and direct the droplet stream into a tub for aspiration down the drain and out the waste port.

Ends of the drive shaft extend outside the chamber 311. A scupper pulley is mounted to the drive shaft near one end (e.g., right end). A reversable electric motor has a shaft with appropriately sized drive pulley. A belt is mounted between the drive pulley and the scupper pulley to pivot the shaft in response to the rotation by the reversable electric motor and raise or lower the sidestream scuppers.

The deflection unit 122 is horizontally adjustable. The deflection unit 122 can be slidingly mounted to a rail and horizontally adjustable from side to side, in order to adjust its position to the center stream path of droplets that enter at a top opening. The deflection unit 122 can be horizontally adjusted so that the center stream of droplets is selectively positioned (equidistant or as otherwise desired) between the left electrostatic charge plate 315L and the right electrostatic charge plate 315R as the droplets enter the deflection cone cutout 310.

Because the droplets can be initially charged and the charge plates may unequally influence entering droplets, the left pivotal side stream scupper 320L, the center non-pivotal aspirator 320C, and the right pivotal side stream scupper 320R are horizontally adjustable together from side to side together. An adjustment knob is provided to horizontally adjust the position of the scupper 320L, the aspirator 320C, and the scupper 320R together along a drive shaft. Accordingly, without charges deflecting the stream of droplets, the center non-pivotal aspirator (collector) 320C can be centered under the center stream of droplets of sample fluid with an adjustment to direct them into the tub and down the drain for aspiration out from the cell sorter through the waste outlet.

As mentioned herein, the deflected droplets pass through the horizontal drop slot 325 in the case 300 for collection in a drop collection chamber 128 below the deflection unit 122. Coupled to the base of the case 300 of the deflection unit 122 is a collection retainer 332 in the drop collection chamber 128. A sort collection holder 330 can be slid into the collection retainer 332 in the drop collection chamber 128. A plurality of test tubes 34, such as shown in FIG. 1, may be inserted into the openings 331 in the sort collection holder 330 to receive the droplets sorted out by the cell sorter. As shown in FIG. 3A, the openings 331 are aligned (front to back in depth) with the horizontal drop slot 325 such that test tubes mounted therein can capture droplets of sample fluid.

Droplets in one or more left deflected stream paths may be received in test tubes to the left of center. Droplets in one or more right deflected stream paths may be received in test tubes to the right of center. FIG. 3A illustrates a four-tube sort collection holder 330 coupled to the base of the case 300 with four openings 331 to hold four test tubes, two test tubes to receive droplets in two left deflected stream paths and two test tubes to receive droplets in two right deflected stream paths.

Referring to FIG. 3B, a plate guide 333 can be used instead of a tube collection retainer (sort collection holder). The plate guide 333 is slid into the collection retainer 332 (see FIG. 3A) and has one or more stream path openings in which selected droplets fall through and out of the plate guide. A plate 35, such as shown in FIG. 1, with a plurality of wells is moved around underneath the plate guide by the loading system to catch droplets in the one or more wells. A plate can have a plurality of wells (e.g., 32 or 64) in which to capture droplets with different types of cells/particles. The plate is moved to align one or more selected wells underneath the respective one or more stream path openings to receive the droplets of sample fluid with the desired cells/particles.

Image Capture of Droplet Stream Formation

The formation of separate droplets from the sheathed sample jet stream is important to control the flow rate of sample fluid and match it to the analysis rate or sorting rate capabilities of a flow cytometer/cell sorter. The sooner separate droplets can be reliably formed the greater the flow rate, analysis rate, and sorting rate can be achieved in the flow cytometer/cell sorter. Also, the more stable the location of the liquid jet break-off, the higher the reliability and accuracy of the droplet sort process. A device in a flow cytometer/cell sorter that can more reliably form independent droplets from the sample stream is a piezo-electrical device around a sample injection tube (SIT) that vibrates in response to a piezo drive signal.

Figure 4A:
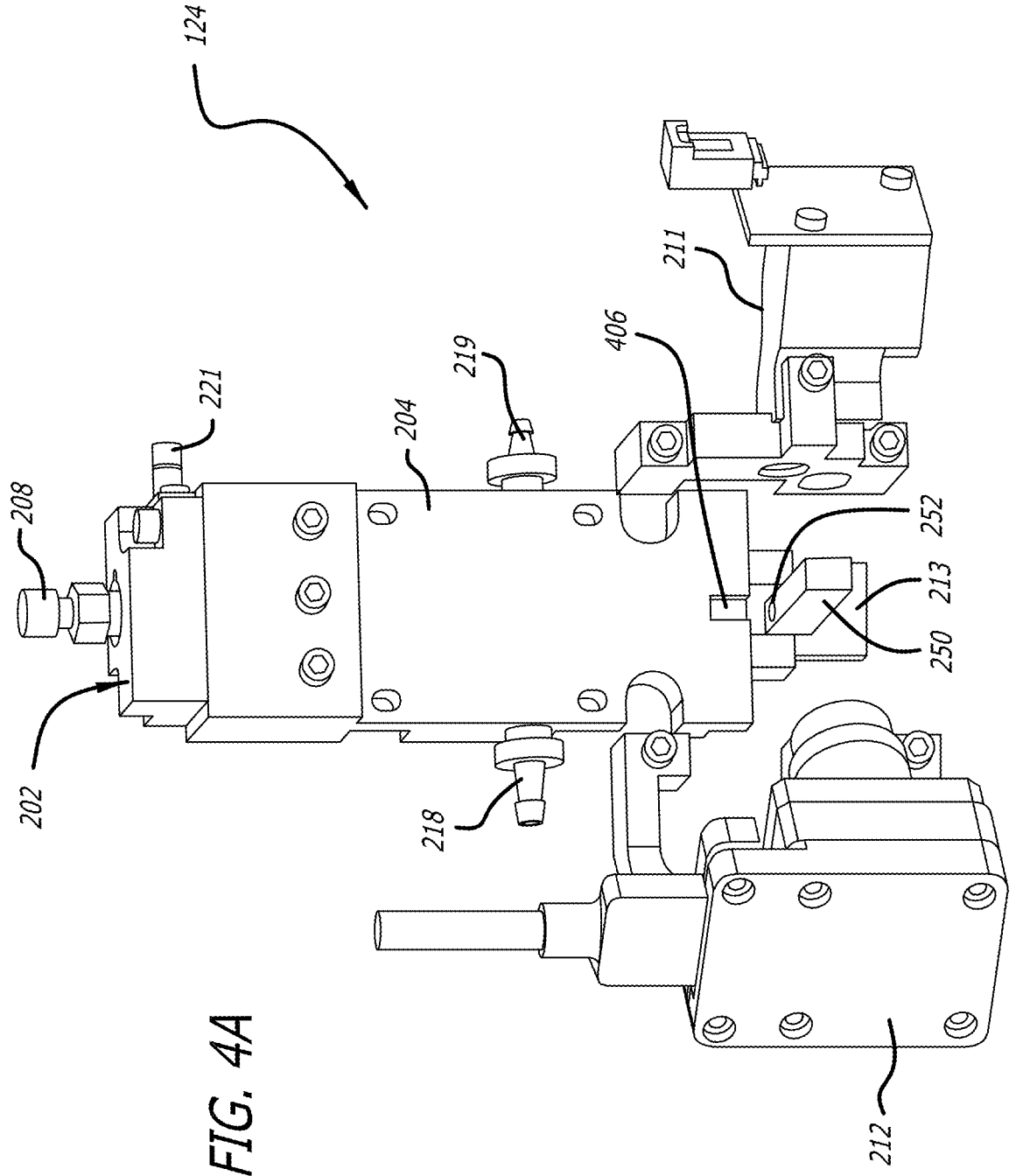
FIG. 4A is a front perspective view of components around the flow cell of the compact cell sorter system including imaging components and fluidic components.
Figure 4B:
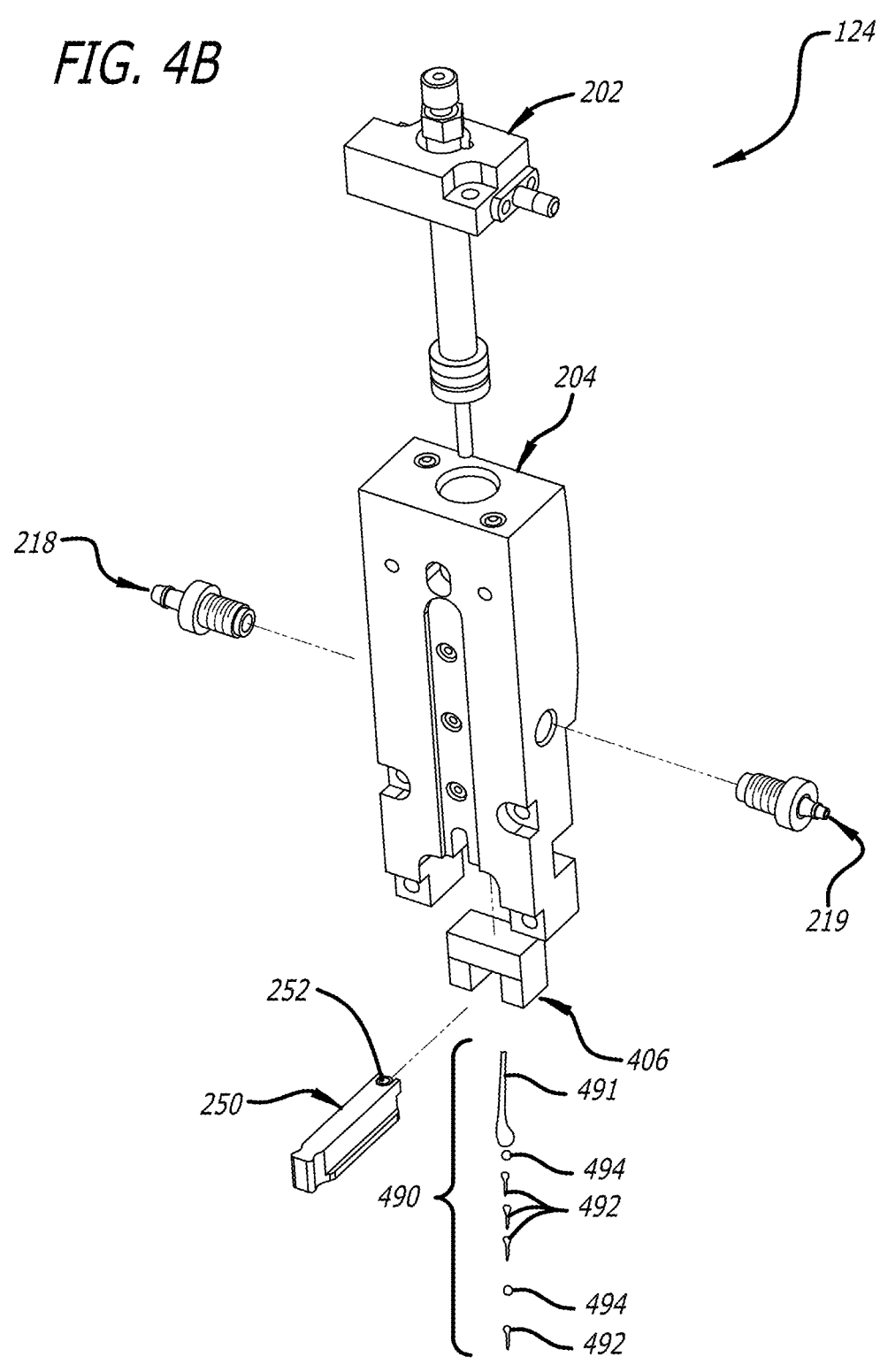
FIG. 4B is an exploded view of components in the flow cell assembly in the compact cell sorter system to adjust the droplets in the sample stream.

Referring now to FIG. 4A, the fluid ports for the flow cell assembly 124 are shown. The flow cell assembly 124 receives the sample fluid through a sample input port 208 of the drop drive assembly 202. The flow cell assembly 124 receives the sheath fluid through a sheath input port (carrier injection inlet) 218. The flow cell assembly 124 surrounds a stream of the sample fluid with sheath fluid. The flow cell assembly 124 can include a conductive fitting that is threaded into the sheath drain port or sheath input port of the flow cell body 204 in communication with fluids in the chambers inside the flow cell. An electrical wire and a hose can both be coupled to the conductive fitting. The electrical wire is in communication with a sort controller to receive a charge signal that is synchronized with the droplets. A charge can be imparted onto the droplets of sheathed sample fluid with a cell/particle through the electrical wire and conductive fitting. Over varying times, the charge signal may be ground, one or more levels of positive charge voltages (e.g., +150, +300), or one or more levels of negative charge voltages (e.g., −150, −300) to respectively keep a droplet uncharged, to positively charge a droplet, or to negatively charge a droplet. Either the fitting of the sheath drain port 219 or the fitting of the sheath input port 218 can be conductive and additionally function as a charge port.

The nozzle assembly 250 above and in front of the flat mirror 213, includes an orifice 252 to receive the sample stream surrounded by the sheath fluid (sheathed sample stream) and form a droplet stream 490 below it. The droplet stream 490 formed by the orifice 252 falls in front of the flat mirror 213 so the diffused LED strobe light 211 can provide a diffused backlight to the droplet stream 490. The camera 212 can capture a better image of the droplet stream 490 with the diffused backlight.

The droplet stream 490 can include a jet stream 491 and one or more droplets 492. The droplet stream 490 can include one or more satellites 494, if any, that are smaller than the droplets 492. The size of the droplets in the droplet stream 490 is generally related to the size of the orifice 252 in the nozzle of the selected nozzle assembly 250. The nozzle assembly 250 is interchangeable so different nozzles with different sized orifices can be used for different sized droplets.

Referring now to FIG. 4B, an exploded view of the flow cell subassembly 124 is shown. The flow cell assembly 124 has a ground connection to shield the sample fluid from charges being generated by the deflection unit and to remove charges that may have been already present prior to charging. The flow cell subassembly 124 includes a drop drive assembly 402, a flow cell body 204, a cuvette 406, and a nozzle assembly 250 in order to generate a droplet stream 490 and the drops or droplets 492 that breakoff therefrom.

The flow cell body 204 of the flow cell assembly 124 receives the drop drive assembly 402. The drop drive assembly 402 includes a sample injection tube (SIT) 422. The drop drive assembly 402 includes a sample input port 408 to receive the sample fluid. The sample injection tube 422 is centered in a chamber within the flow cell body 204. The sample injection tube 422 is preferably formed of glass to avoid surface etching in the presence of electrical currents in the sheath fluid for droplet charging and vibration of the drop-drive for droplet separation that can cause leakage.

The cuvette 406 includes a flow channel with an interrogation region to allow a sample stream of cells with a sheath fluid to be examined. The cuvette 406 is transparent so that one or more lasers can strike the moving cells in the sample stream with scattered light and fluorescent light being captured by a plurality of detectors.

The nozzle assembly 250 slides in and out of a mount under the cuvette to receive the sheathed sample stream out of the flow channel in the cuvette. The nozzle of the nozzle assembly includes the orifice to receive the flow of sheathed sample fluid from the cuvette and forms droplets 492 from the droplet stream 490 of the sheathed sample fluid below it. Each droplet preferably has a single cell/particle that can be sorted.

Figure 4C:
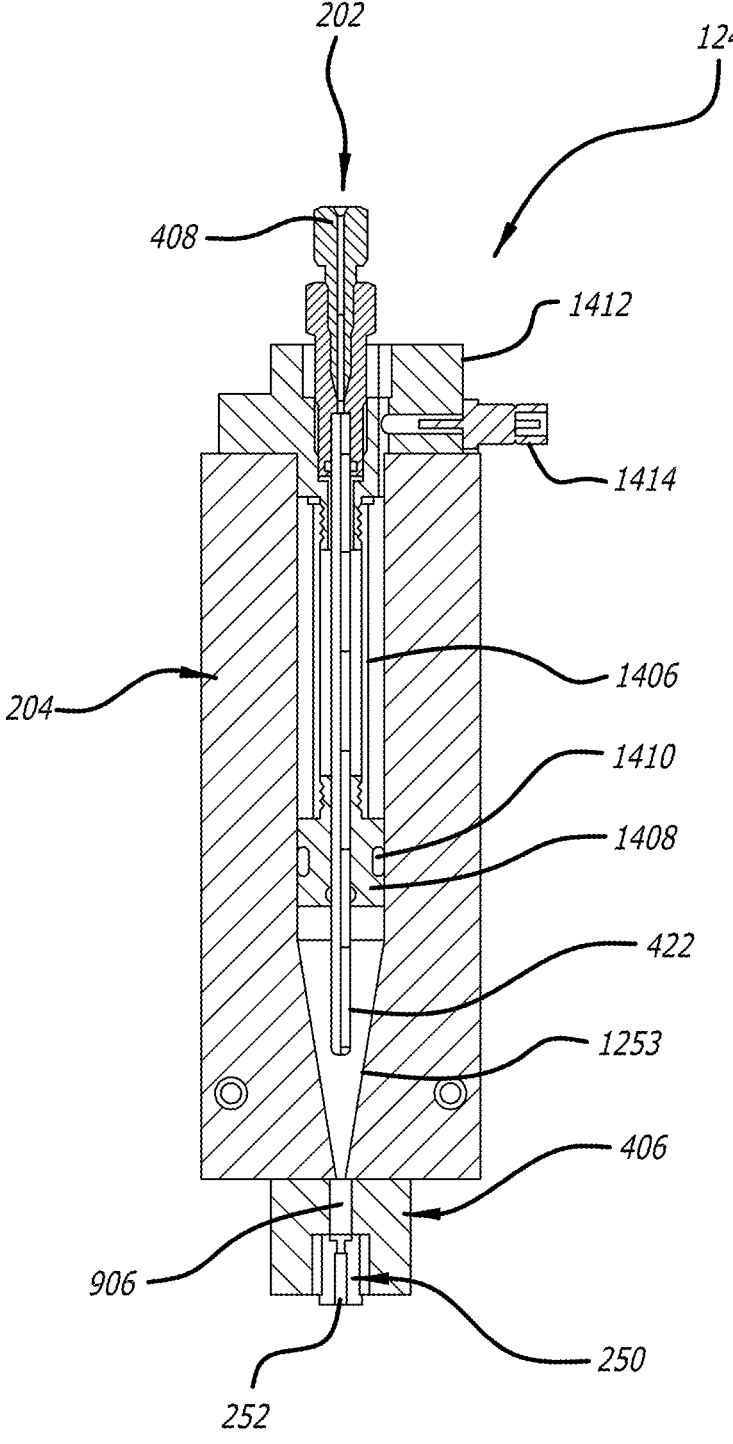
FIG. 4C is a cross sectional view of portions of the flow cell assembly including a drop drive assembly.

Referring now to FIG. 4C, a cross-sectional view of portions of the flow cell assembly 124 including the drop drive assembly 202 is shown. The flow cell assembly 124 includes the flow cell body 204, the drop drive assembly 202, a cuvette 406, and a nozzle assembly 250 with the orifice 252 in a nozzle. The cuvette 406 has a flow channel to allow a fluid stream (sheath fluid around sample fluid) from the flow cell body to flow through into the orifice 252 of the nozzle in the nozzle assembly 250.

The drop drive assembly 202 includes a metal hub 1412 that couples it to the flow cell body 204. The drop drive assembly 202 further includes a sample injection tube (SIT) 422 having one end inserted an opening of the hub 1412 and a sample input port. At one end, the SIT receives sample fluid through the sample input port 408 from a tube or hose. The lower portion of the drop drive assembly below the hub 1412 is inserted into a fluid chamber of the flow cell body 204. A lower end of the sample injection tube 422 is located in a funnel portion 1253 of the fluid chamber. From the lower end of the sample injection tube 422, sample fluid can be injected into the center of sheath fluid in the funnel portion and flow out of a base opening in the fluid chamber and out from the flow cell body 204 into the cuvette 406.

The drop drive assembly 202 further includes an electrical jack 1414 and a hollow piezoelectric cylindrical transducer 1406 both of which are mounted to but electrically insulated from the metal hub 1412. A positive terminal of the electrical jack 1414 is electrically coupled to a positive terminal of the hollow piezoelectric cylindrical transducer 1406. A negative terminal of the hollow piezoelectric cylindrical transducer 1406 is coupled to a negative terminal of the electrical jack 1414. An insulated cylindrical sealing base 1408 is coupled to an opposite end of the hollow piezoelectric cylindrical transducer 1406. The insulated cylindrical sealing base 1408 has a sealing O-ring 1410 to keep fluids away from the hollow piezoelectric cylindrical transducer 1406. The lower end of the sample injection tube 422 extends through the insulated cylindrical sealing base 1408 so it can be injected into the center of sheath fluid in a funnel portion 1253 of the flow cell body 204.

The hollow piezoelectric cylindrical transducer 1406 is an instance of a piezoelectric device referred to herein that can impart vibrations into the sheathed sample stream. The hollow piezoelectric cylindrical transducer 1406 mounts around a portion of the sample injection tube 422 when assembled together. Vibrations from the hollow piezoelectric cylindrical transducer 1406 at one end can be mechanically coupled into the hub 1412 and the sample injection tube 422 through which it is inserted. Vibrations from the hollow piezoelectric cylindrical transducer 1406 at an opposite end can be coupled into the insulated cylindrical sealing base 1408 and the sample injection tube through which it is inserted. Sample fluid with cells/particles flows within the hollow center cylinder of the sample injection tube 422. The vibrations from the hollow piezoelectric cylindrical transducer 1406 are also exerted onto the sheathed sample fluid and travel to generate acoustic waves that propagate in the fluidic medium through the nozzle orifice down to the liquid jet causing the jet breakoff and the formation of droplets (with or without tails) at varying rates out of the orifice 252 of the nozzle.

The sheathed sample fluid receives acoustic energy that can help convert the sheathed sample fluid into a stream of small droplets spread out in a single file line out of the orifice of the nozzle. Ideally, each droplet has a single cell/particle, but cells/particles of interest can vary in size. The diameter of the opening in the nozzle, the sheath pressure, and fluid viscosity can vary the size of droplets, whereas the frequency of vibrations in the piezo device determine their frequency of generation. For a given sheath fluid pressure, the AC signal frequency and amplitude of an AC piezo drive signal can be set for resonance where droplets form more readily, and are more stable over time. The nozzle assembly can be readily swapped in and out for a different nozzle assembly to get a different diameter of nozzle opening (orifice) for different droplet sizes.

The hollow piezoelectric cylindrical transducer 1406 receives an alternating current (AC) piezo drive signal through the terminals of the electrical jack 1414. The drive signal is a high powered alternating current (AC) signal (amplitude and frequency selectable) from the electronics in the system. The drive signal has high current and voltage capabilities in order to effectively vibrate the piezo device. The hollow piezoelectric cylindrical transducer 1406 vibrates based on frequency and amplitude of the high powered electrical AC drive signal. The frequency of the high powered electrical drive signal can be selectively varied and therefor vary the frequency of vibrations of hollow piezoelectric cylindrical transducer 1406 that are transferred into the sheathed sample stream. A signal amplitude of the high powered electrical drive signal can be selectively varied and therefor vary amplitude of vibrations of hollow piezoelectric cylindrical transducer 1406 that are transferred into the sheathed sample stream. The frequency of the drive signal can be used to vary the formation rate of droplets out from the orifice 252 of the nozzle in the nozzle assembly. At a given drive frequency and sheath pressure, the amplitude of the drive signal can be used to vary the location of the jet break-off point and the droplet interval described herein.

U.S. patent application Ser. No. 17/665,480, titled INTEGRATED COMPACT CELL SORTER, filed on Feb. 4, 2022, by inventors Glen Krueger et al., incorporated herein by reference, discloses further information regarding the flow cell including the flow cell body, the drop drive assembly, and the sample injection tube (SIT).

LED Strobe Light and Hardware Triggered Camera

FIGS. 1, 2A-2B introduced the flat mirror 213, the digital camera 212, the diffused LED strobe light 211, and the associated mounts to couple the camera and strobe light to the flow cell body of the cell sorter/flow cytometer. The synchronized hardware triggered camera and strobe light can provide visual feedback to a liquid jet breakoff control system in order to better control the piezo-electric device and the formation of independent droplets of sample fluid surrounded by sheath fluid in the droplet stream from the flow cell and the sample injection tube (SIT). Additional details of the hardware triggered camera and strobe light are described.

Figure 4D:
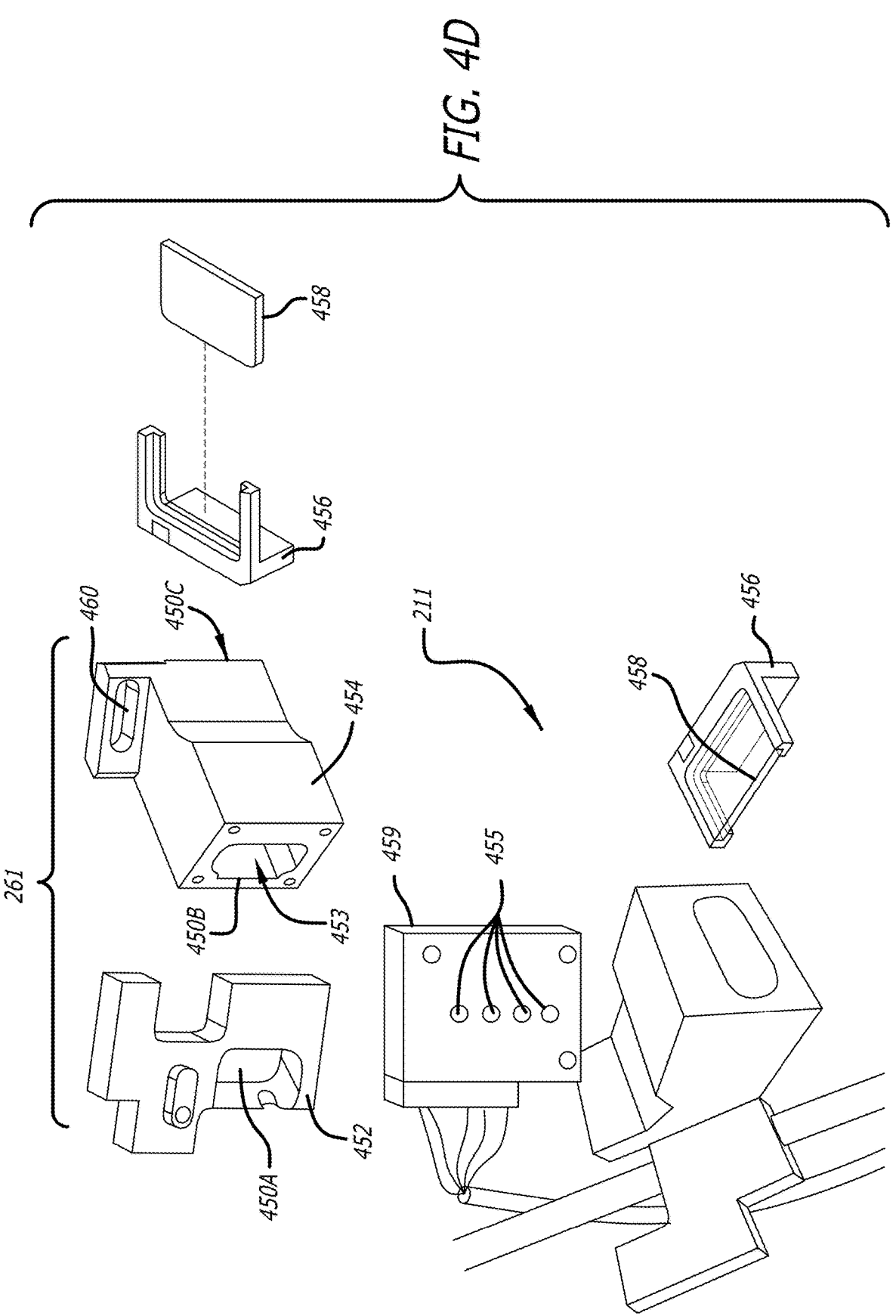
FIG. 4D is an exploded view of the components of an LED strobe light source.

Referring now to FIG. 4D, an exploded view of the diffused LED strobe light 211 and illumination mount 261 is shown isolated from other components of the flow cell assembly. The illumination mount 261 includes a bracket 452 and a hollow housing 454. The bracket 452 has one end that adjustably couples to the center bracket 265 shown in FIG. 2B.

The diffused LED strobe light 211 includes the framed diffuser 458 that includes a diffuser coupled to a diffuser frame 456. The framed diffuser 458 is mounted over an opening 450C in one end of the hollow housing 454. An opening 450A in the bracket 452 is aligned with an opening 450B in the opposite end of the hollow housing 454. An oval opening 460 allows the position of the hollow housing 454 to be adjusted with the diffuser and LEDs so that they are in proper alignment with the optical axis into the flat mirror 213. Between the opening 450B and the opening 450C, the hollow housing 454 includes a hollow reflective chamber 453.

The diffused LED strobe light 211 further includes a printed circuit board (PCB) 459 with the LED electrical connector 263 near an edge and a plurality of infrared (IR) light emitting diodes (LEDs) 455 mounted in a vertical row to one side of the printed circuit board 459. FIG. 4D illustrates four infrared LEDs 455 that are mounted to the PCB 459 in a row. However, more or less infrared LEDs 455 can be used mounted to the PCB 459 provided that they provide sufficient illumination for capturing brightfield still images of the droplet stream. The infrared (IR) LEDs 455 can be made by LUXEON selected from their IR Domed Line with high current and power, such as part number L110-0940050200000 for example. Generally, the high current infrared LEDs and the diffuser periodically provide a diffused infrared backlighting but in a synchronized fashion when triggered into generating a synchronized diffused strobe lighting for the capture of brightfield still images of a droplet stream.

Figure 4E:
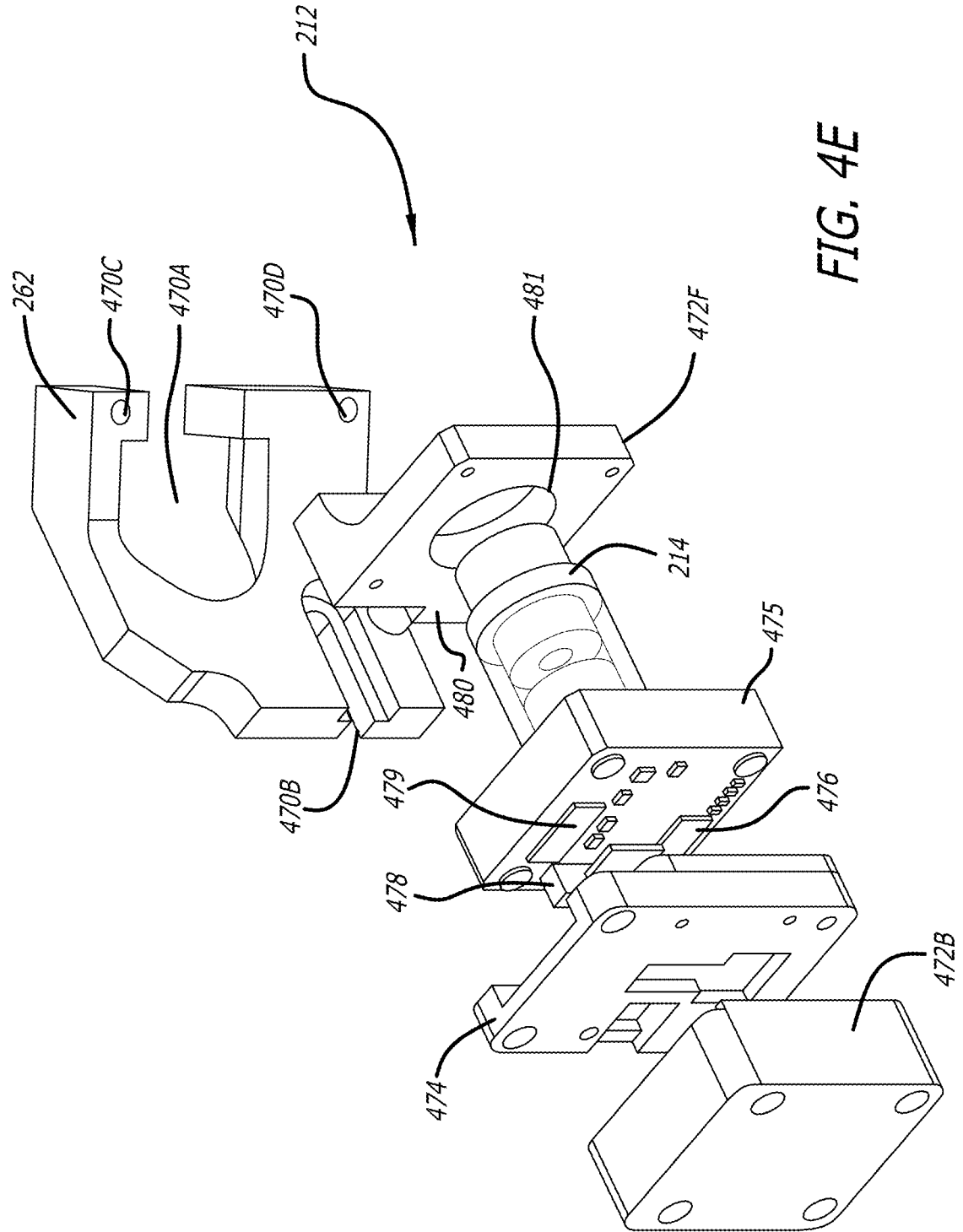
FIG. 4E is an exploded view of the components of a hardware triggered camera.

Referring now to FIG. 4E, an exploded view of the hardware triggered digital camera 212 and camera mount 262 is shown isolated from other components in the flow cell assembly. The camera mount 262 has a body with a pair of bolt openings 470C and 470D to couple to an end of the center bracket 265 shown in FIG. 2B with a pair of bolts or screws. The body of the camera mount 262 further includes an opening 470A to receive a side scatter camera or detector.

The camera 212 includes a front enclosure 472F, a camera body 475 with a printed circuit board, one or more camera lenses 214 in front of the camera body, a camera enclosure 474, and a back enclosure 472B. The front enclosure 472F has a body with a center opening 481 to receive the one or more camera lenses 214. The camera enclosure 474 couples to and covers over the printed circuit board of the camera body. The back enclosure 472B couples to the camera body 475 through the camera enclosure 474. The back enclosure 427B and the front enclosure 472F enclose the printed circuit board and couple the camera body to the camera mount (mounting bracket) 262. The camera mount 262 includes a mounting slot 470B to which a side portion 480 of the front enclosure 472F can be slidingly fitted in alignment and bolted to the body of the camera mount. The mounting slot 470B allows some focal adjustments of the camera 212.

The printed circuit board of the camera body 475 has one or more metal traces and a connector 478 to receive the hardware trigger input signal from a controller. The printed circuit board further has one or more metal traces and a data connector 479 to share captured images with an image processor/controller or a computer. A universal serial bus (USB) cable can connect to the data connector 479 for bidirectional communication. The printed circuit board further has a camera chip 476 mounted to it coupled in communication with one or more metal traces of the PCB. The active area of the camera chip 476 is aligned with the optical axis of the one or more lenses. The hardware triggered digital camera 212 can be a BASLER DART USB 3.0 camera module with an ONSEMI AR0134 camera sensor (chip) having model number daA1280-54um, for example. The ONSEMI AR0134 camera sensor (chip) is a progressive scan CMOS sensor with a global shutter causing all pixels to be exposed at the same time and all pixels to stop being exposed at the same time during an exposure time period. The pixel data captured by the pixels can thereafter be readout during a readout time period.

The camera chip 476 receives a hardware trigger signal (hardware trigger pulse) that is a pulse signal with a short time period. The hardware trigger signal triggers the camera chip to capture data from all pixels in the active area simultaneously in parallel in the short time interval. Frequent and periodic visual inspection of the droplet stream by the droplet control system ensures proper regulation of the jet breakoff location and droplet interval. The hardware trigger signal for the hardware triggered digital camera 212 appropriately timed with or in synchrony with the LED strobe light trigger is the way to do so.

Figure 5A:
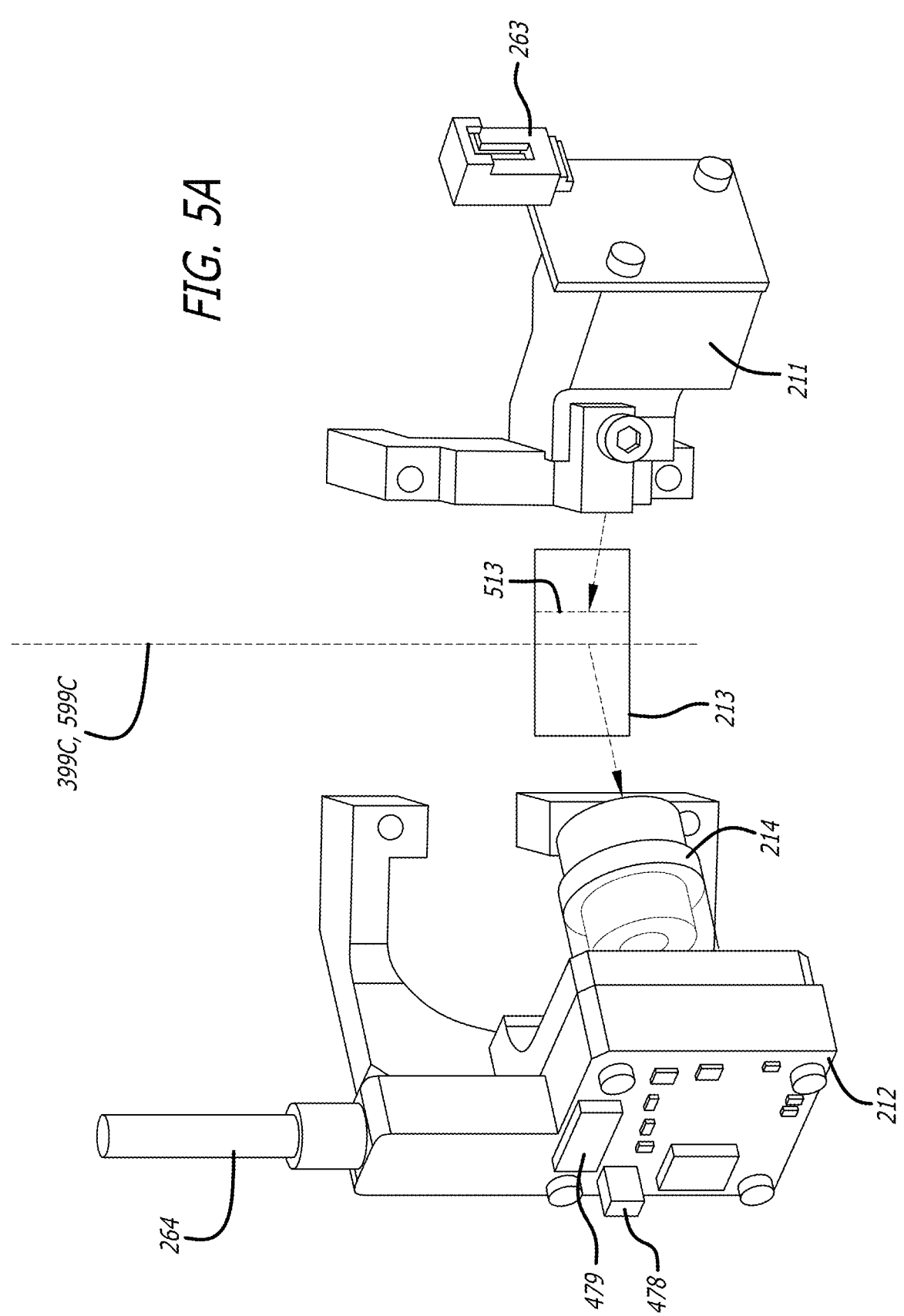
FIG. 5A illustrates a front view of the fluid axis of the stream of drops, droplets, and satellites in relation to optical axes of the camera and the LED strobe light source.

Regarding now to FIG. 5A, the diffused LED strobe light 211, flat mirror 213, and camera 212 are shown isolated from other components of the flow cell assembly in the cell sorter/flow cytometer. A center droplet stream including a liquid jet, droplets, and, if any, satellites, falls down a jet stream axis (fluid axis) 599C passing in front of the mirror so it can be backlit by the diffused strobe light and a brightfield image of the droplet stream captured by the hardware triggered digital camera 212. The diffused LED strobe light 211 is triggered by a digital strobe signal to generate the diffused strobe light that shines into the mirror to backlight the droplet stream. The camera 212 is appropriately triggered in time with or in synchronous with a periodic strobe signal by a periodic hardware camera trigger signal to periodically capture a droplet stream image of the droplet stream. Each droplet stream image (still photo) captured by the camera can be sent to a processor/controller for visual analysis of the droplet stream and adjustment of the amplitude of the piezoelectric actuator's drive signal.

Figure 5B:
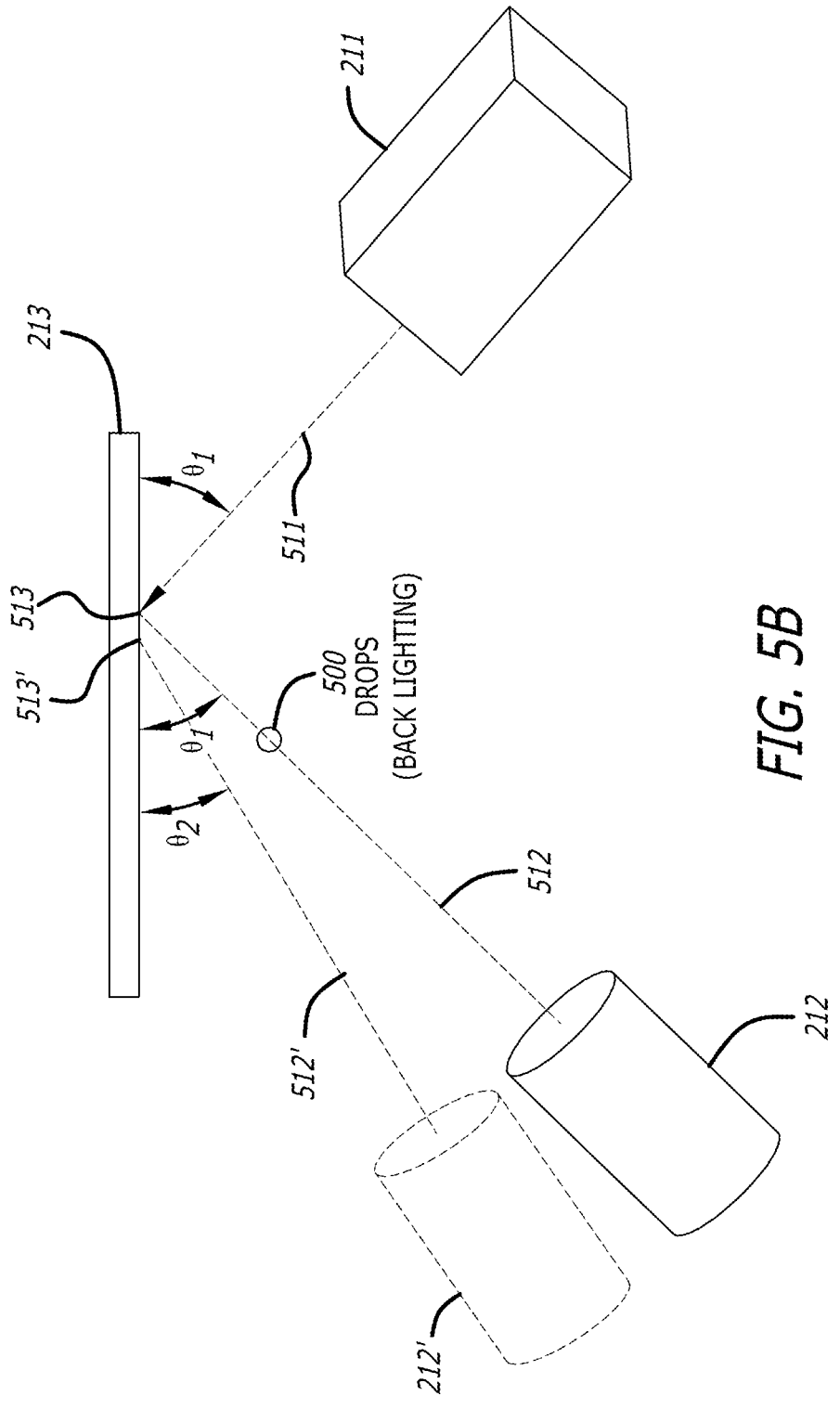
FIG. 5B illustrates a schematic diagram of a top view of the fluid axis of the stream of drops in relation to the optical axes of the camera and the strobe light source with respect to the flat mirror.

In FIG. 5B, a top view of the diffused LED strobe light 211, flat mirror 213, and camera 212 better show how drops 500 in a droplet stream along the fluid axis 599C are backlit by the diffused strobe light from the diffused LED strobe light 211. The diffused LED strobe light 211 shines the diffused strobe light into the flat mirror 213 along a strobe axis 511 into a vertical axis 513. The reflection of the diffused strobe light from the flat mirror 213 backlights the droplet stream 500 along a camera axis 512 with the camera 212 from the vertical axis 513. At the vertical axis 513 along a surface of the flat mirror 213, the diffused LED strobe light 211 and camera 212 can be aligned together so that the respective optical axes 511,512 of each is at a similar (equivalent) angle (e.g., theta one angle) with a plane surface of the flat mirror. In other cases, they can be aligned at different vertical axis 513,513' at the flat mirror 213 with optical axes 511,512' at dissimilar (inequivalent) angles (e.g., theta one angle and theta two angle). The fluid axis 599C can intersect the camera axis 512 at a substantial perpendicular angle. However, the camera axis 512 can also be slightly offset from the fluid axis 599C and not at a perpendicular angle, while a suitable droplet stream image can still be captured. Moreover, a center optical axis of the camera chip in the camera can be slightly offset from the camera axis 512 and a suitable droplet stream image can still be captured by it.

Figures 6A, 6B:
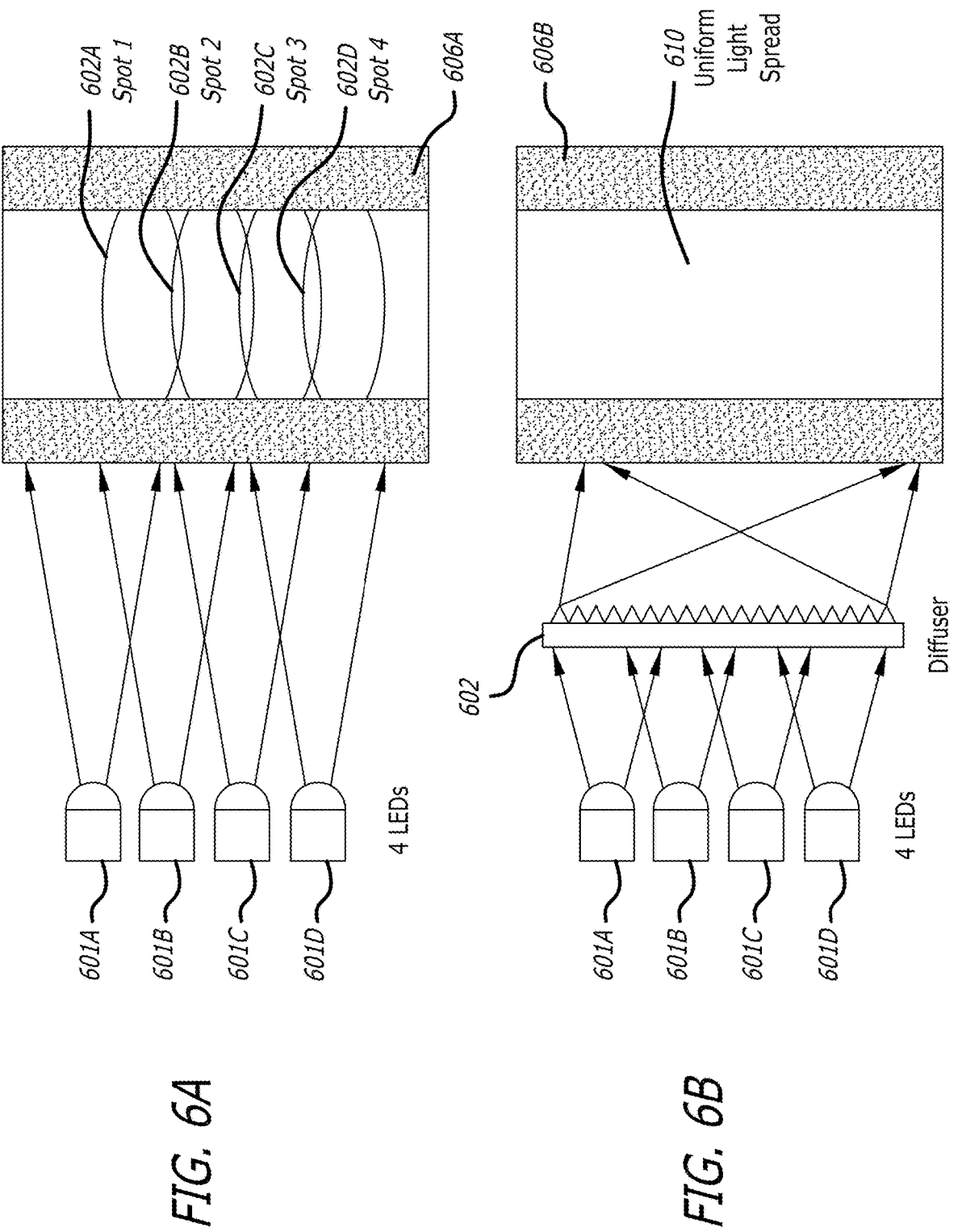
FIG. 6A is a schematic view of LED strobe lights without a diffuser and a captured image of reflected backlighting associated therewith.
FIG. 6B is a schematic view of LED strobe lights with a diffuser and a captured image of reflected backlighting associated therewith.

FIGS. 6A-6B compare a strobe light having four LEDs with and without a diffuser. In FIG. 6A, four LEDs 601A-601D are spaced apart with their light shining into the flat mirror 213. No diffuser is used to modify the distribution of the light from each of the LEDs. An image 606A is captured of the backlighting provided by the four LEDs 601A-601D without a diffuser. The image 606A illustrates four spots 602A-602D respectively formed by the four LEDs 601A-601D with a brightest spot 604 near the middle position of the four LEDs 601A-601D with the brightness decreasing away from the brightest spot 604.

In FIG. 6B, the same four LEDs 601A-601D are spaced apart with a diffuser 602 over them into which the light from the four LEDs shines into as shown. The diffuser 602 spreads out the light from each of the four LEDs into a diffused light that shines into the flat mirror 213. An image 606B is captured of the backlighting provided by the four LEDs 601A-601D with the diffuser 602. The image 606B illustrates a substantially even and uniform light spread 610 provided by the diffused light from the diffuser and the four LEDs. Accordingly, the backlighting for the droplet stream is substantially uniform in a vertical direction over which they fall. The vertical distance over which the droplet stream image is captured can be larger with the substantial uniform backlight than that of the spotty backlight generated without a diffuser.

Imaging and Strobe Light Generation

A camera and a strobe light are used synchronously together, signaled at appropriate times, to capture brightfield images. The camera is a digital hardware triggered camera with a global shutter. The global shutter in the camera is activated over an exposure period to capture an image with a plurality of pixels sensors (camera pixels). Pixel data is captured concurrently in parallel from the plurality of camera pixels. The strobe light can be pulsed one or more times during the exposure period to capture the image.

Referring now to FIG. 16A, a conventional strobe pattern, a strobe pulse train 1602 can be used in synchronous with a sign bit pulse train 1604 to periodically activate the LED strobe light. The sign bit pulse train 1604 can be associated with a zero-cross detection (or cross-over detection) of the piezo drive signal. The digital camera can be activated by a software timed trigger signal to capture an image over a time period of an exposure window 1606. The exposure window time period with a software time trigger signal can be between one hundred and two hundred milliseconds, for example. The strobe pulse train 1602 typically has a plurality of pulses (e.g., 10 pulses) to activate the strobe light multiple times per exposure over a relatively lengthy exposure window 1606 for a plurality of zero-crossing detections being associated with the sign bit pulse train. The amplitude of the pulse signal in the strobe pulse train 1602 is the same at a constant level. Generally, a software timed trigger is used with the camera to hold the shutter or sample period of the camera for such a lengthy exposure period over the numerous strobes for each exposure period. That is, there are multiple strobes for one frame of image data (e.g., 1000:1 strobe-frame ratio) for multiple different cells to provide averaging. With the conventional strobe pattern, fuzzy droplet edges can appear in an image when there is a minor jitter in the strobe signal and/or cell flow. If there is any instability or disturbance in the sample fluid flow or the sheath fluid flow, the droplet stream can appear blurred with a conventional strobe pattern. Disturbances can occur due to numerous reasons such as sheath flow rate fluctuations, air bubbles passing through fluidic system, temperature variations, etc. Furthermore, the captured images of the droplet stream are sensitive to ambient light with the conventional strobe pattern from an LED strobe light without a diffuser.

Referring now to FIG. 16B, a new strobe pattern is used to further improve the image capture of a droplet stream for the cell sorter/flow cytometer. Instead of a software timed trigger, the hardware triggered digital camera 212 has a hardware camera trigger signal (digital trigger signal, hardware trigger signal, hardware trigger pulse) 1610 to accurately trigger the digital camera to begin image capture synchronous with or in time with a desired zero-cross detection sign-bit signal and the strobe light. The new strobe pattern is a single LED strobe pulse (digital strobe signal) 1612 for one frame of image data captured over a short exposure window 1616, such as two hundred (200) microseconds (uSec), to capture an image of a few droplets. The strobe-to-frame ratio is 1:1 with the strobe pattern of the strobe pulse signal 1612. No averaging is needed to analyze a single breakoff point of a droplet.

There is a delay between the hardware camera trigger signal 1610 and an opening time point 1617 that opens the exposure window 1616. The exposure window 1616 opens at the opening time point 1617 about ten (10) microseconds to twenty (20) microseconds before the generation of the high current LED strobe pulse signal 1612 to begin the capture of pixel data. The exposure window 1616 closes at a closing time point 1618 of about one-hundred-eighty (180)

microseconds to one hundred-ninety (190) microseconds after the generation of the high current LED strobe pulse signal 1612 to end the capture of pixel data. Accordingly, the exposure window 1616 can have a time period between 190 microseconds and 210 microseconds.

The objects (e.g., liquid jet, droplets, satellites) in the image have a high rate of velocity. The hardware trigger signal and the synched strobe pulses allow liquid jet breakoff to be regularly and periodically monitored with an inexpensive camera having a global shutter to capture substantially all the pixels at the same time. Accordingly, the camera 212 is a digital camera with a global shutter responsive to a hardware trigger signal, such as the hardware camera trigger signal 1610. Without a global shutter, the captured image of droplets is distorted.

Figure 7B:
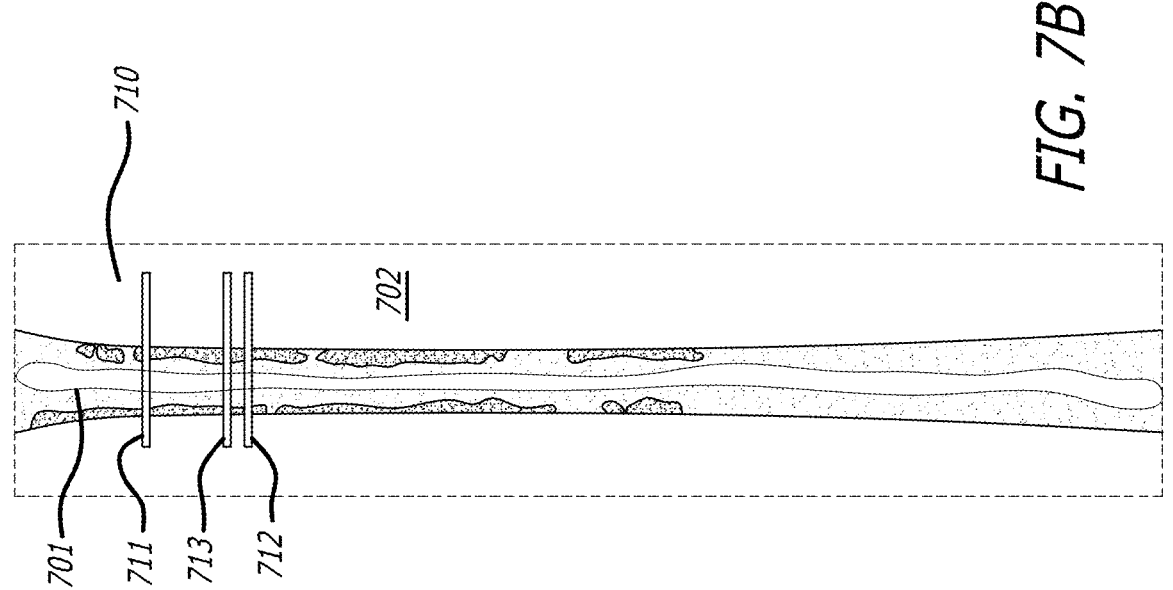
FIGS. 7A-7B are images of a droplet stream associated with the schematic view of the light sources respectively shown in FIGS. 6A-6B with unsynchronized strobe lights.
Figure 7A:
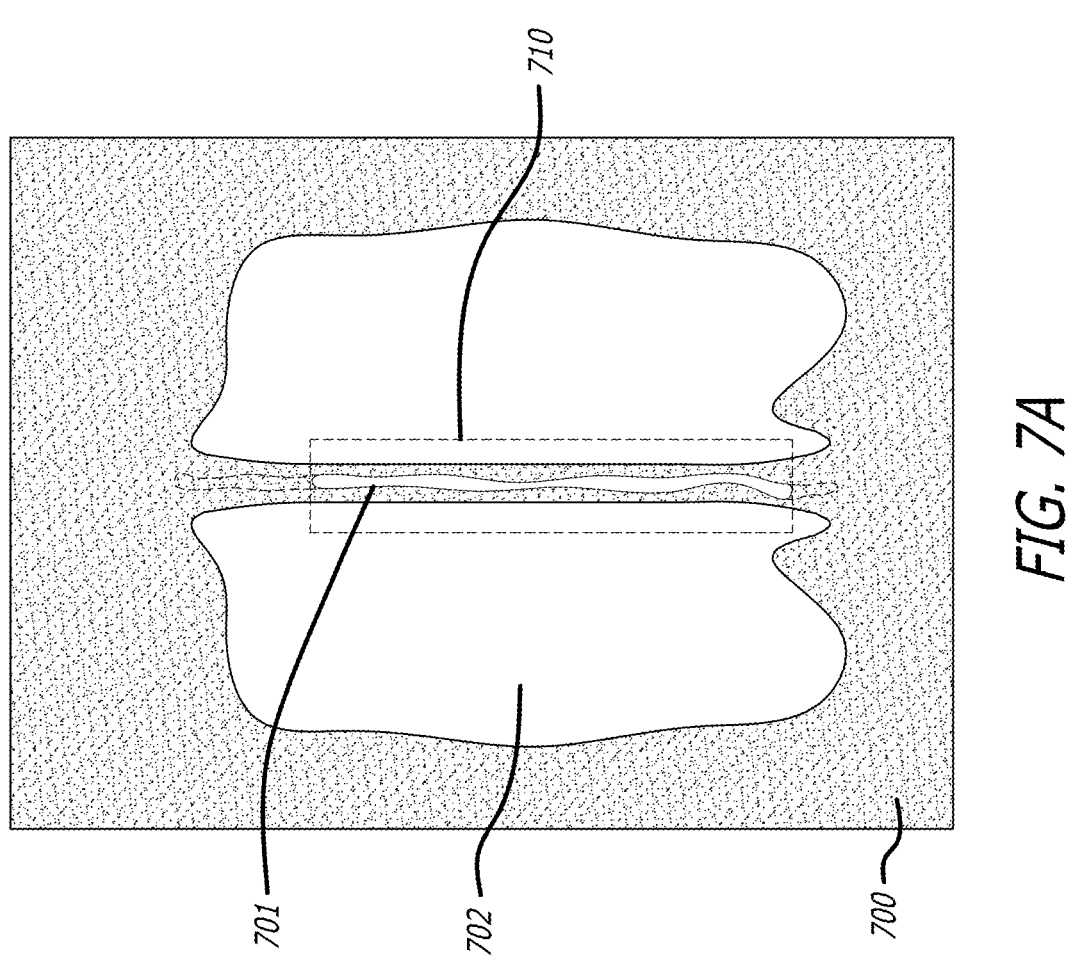
Figure 8B:
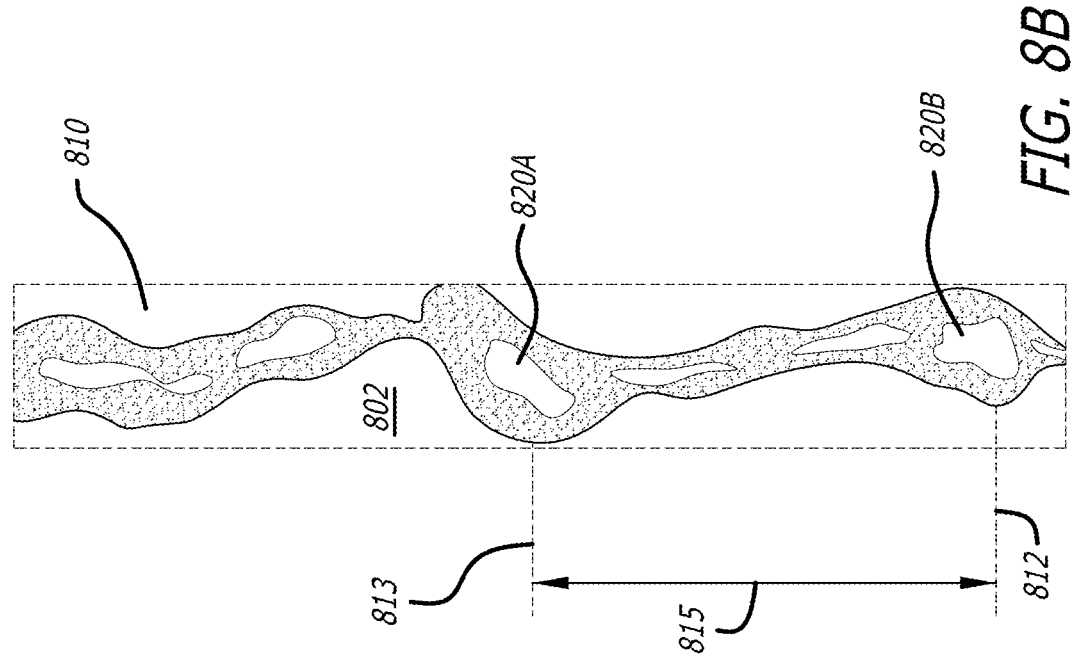
FIGS. 8A-8B are images of a droplet stream associated with the schematic view of the light sources respectively shown in FIGS. 6A-6B when strobe lights are triggered in synchrony with the piezoelectric actuator's acoustic excitations.
Figure 8A:
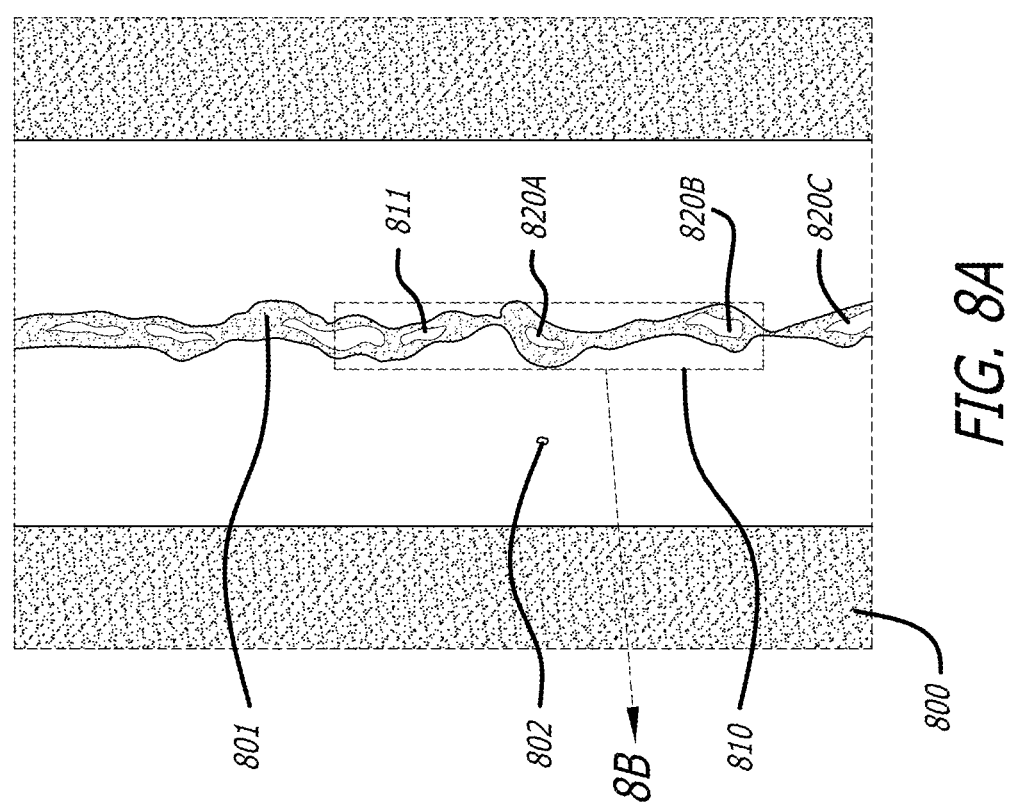

FIGS. 7A-7B are images captured with a conventional strobe pattern with strobe backlighting (without a diffuser), and software triggering of a conventional digital camera can be compared against FIGS. 8A-8B using the new strobe pattern with the diffused strobe light, and hardware trigger of a digital camera. FIGS. 8A-8B provide crisper images than those of FIGS. 7A-7B. With the 1:1 strobe-to-frame ratio, there is no averaging-out over numerous breakoff events associated with multiple zero-cross (or cross-over) detection signals. Furthermore, the new strobe pattern, the diffused strobe light, the hardware trigger signal, the hardware triggered digital camera, and the short exposure interval combine to provide a droplet stream image capture system that has little to no sensitivity to ambient light.

In FIG. 7A, the droplet stream image 700 is captured from uneven backlighting 702 formed without a diffuser in front of the LED bulbs. The jet stream 701 appears to be constant without breaks where droplets might have been formed. A magnified view 710 shown in FIG. 7B where one would expect droplet formation (shown by the horizontal lines 711,712,713) is difficult to discern. It is desirable to recognize at least two droplets in a row in the droplet steam to calculate distance between droplets and control the jet breakoff point. With the poor image quality captured in FIGS. 7A-7B with uneven backlighting, it would be difficult to use machine or computer vision to detect a jet breakoff point and a droplet interval to make control decisions.

Droplets may form later in the droplet stream or in a slower rate of flow at the given point. However, slowing the rate of flow also slows down the analysis of cells and the through put of the overall sample from a test tube. Viewing droplets at a lower position delays droplet control and sorting decisions so that it is more difficult to analyze and make control decisions, ultimately resulting in wasting more cells of a sample. It is desirable to quickly make control decisions for droplets in the droplet stream.

In FIG. 8A, a droplet stream image 800 of a sample stream 801 is captured with even backlighting 802 where a diffuser is used in front of the LED bulbs. The sample stream 801 has droplets 820A-820C being formed between tails 811. A magnified view 810 of the sample stream 801 is shown in FIG. 8B.

FIG. 8B shows that the droplets 820A-820B are about to be formed early in the vertical droplet formation process out from the orifice of the nozzle down a center droplet line 399C (see FIG. 3B) towards the center non-pivotal aspirator 320C, unless subsequently deflected off the center droplet line, such as towards scupper 320L along a left droplet line 399L or towards scupper 320R along a right droplet line 399R. With the magnified view 810, computer vision can be used to automatically calibrate and control a jet breakoff point and droplet formation. Positions of a center point 813 for droplet 820A and a center point 812 for droplet 820B can be determined from image analysis. A droplet interval 815 can be computed from the known positions of the center point 813 and the center point 812 of adjacent droplets in the sample stream 801.

Image Analysis with Machine Learning

Figure 11:
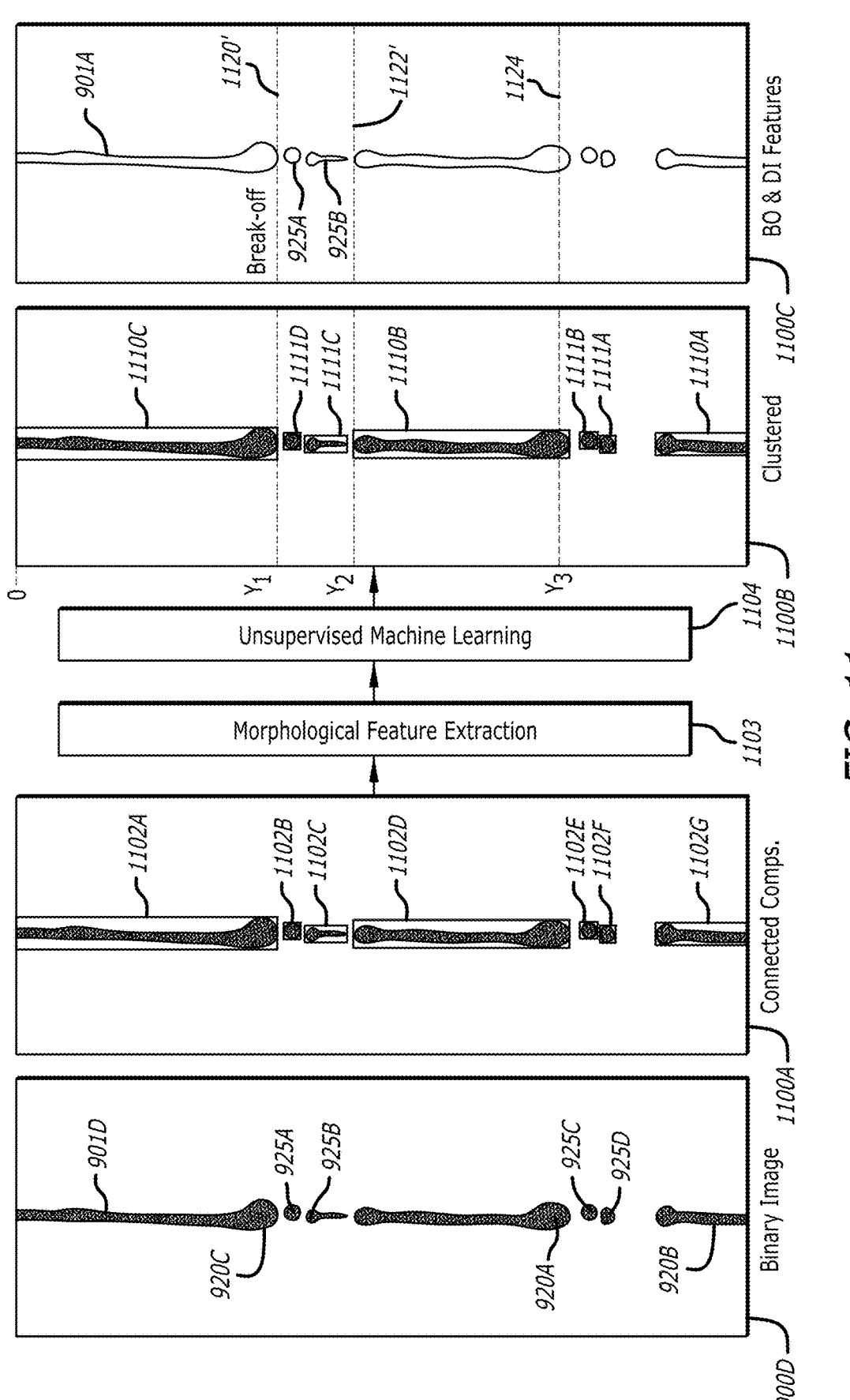
FIG. 11 illustrates various computer vision and machine learning stages of an image that captures a stream of drops with droplets and satellites.

In order to perform cell sorting, real-time analysis of the droplets and cells in the droplets is desirable in order to determine whether to sort cells into bins or buckets for further analysis or just a waste bin or bucket where they are discarded. Droplet formation is usually manually adjusted and initially calibrated before running experiments. Better control of the formation of droplets and regulation of breakoff location is desirable to provide more reliable and accurate sorting of the cells in the droplets. Furthermore, automated calibration and automated real-time control are desirable to reduce human error with a cell sorter/flow cytometer when running biology experiments. With better droplet stream images, machine learning can be used to better analyze breakoff location and droplet interval, thereby enhancing synchrony of the formation of droplets and stream charging in a cell sorter/flow cytometer earlier in the droplet formation process. FIG. 11 shows images of using machine learning from a droplet stream photo captured with diffused backlighting provided by a diffuser in front of the IR LED bulbs, such as shown in FIG. 6B.

Referring now to FIG. 9A, droplet generation starts with a jet stream of sheathed sample fluid forced out from the orifice in the nozzle due to the pressurization of the sheath fluid, the piezo element vibrations, and gravity. Gravity pulls on the jet stream causing an oval to grow in size around the cell or particle necking down the jet stream. As the jet stream grows further away from the nozzle, the necking of the jet stream gets narrower. The jet stream becomes so narrow at one point (the jet breakoff point) that a droplet breaks off from the jet stream. The droplet may have a tail until it consolidates down or becomes satellites. If all things remain equal, the jet breakoff also happens at certain periodic points of time separated by an interval corresponding to the frequency of the piezo device vibrations. That is, there is a droplet interval time between the completion of droplet formation. Accordingly, jet breakoff is a function of time and location. With continued sample and sheath fluid flow, the process continues. After one droplet is generated and falls further away from the nozzle, the jet stream then grows again in length and repeats the process of droplet formation.

In an image of the droplet stream, a measured jet breakoff point (Y1 minus 0) can be determined by the number of pixels down from the top of the image (zero) to the location (Y1) at which the liquid jet first becomes disjoint, such as the breakoff line 1120' shown in FIG. 11. The jet breakoff point 1120 at the jet breakoff line 1120' can be more simply referred to as the breakoff point. When the liquid jet becomes disjoint at the breakoff point, two types of elements may form, i.e., droplets and, if any, satellites. The difference between droplets and satellites lies in their respective size. Droplets are much larger than satellites, so they are distinguishable. For example, as shown in the binary image 900D in FIG. 11, satellites 925A, 925B, 925C, and 925D are distinguishable from droplets 920A and 920B that are larger and have tails. A measured droplet interval can be represented as the number of pixels (absolute distance=Y2 minus Y1) between the jet breakoff point at the jet breakoff line 1120' to the top of a first full droplet represented by the top of the cluster bounding box 1110B at a droplet interval line 1122'.

Referring now to FIGS. 9A-9D, the captured image of the droplet stream is processed by an image processing block prior to recognition with a computer vision algorithm. In FIG. 9A, a magnified raw brightfield image (still photo) 900A of a droplet stream 901A of droplets captured with an even white backlighting 910. The raw brightfield image is captured by the hardware triggered camera with the even white (or infrared) backlighting being provided by the diffused LED strobe light. FIG. 9A illustrates a magnified view of a raw brightfield still The droplet stream 901A is formed from a sheathed sample stream exiting the flow cell. Preferably, image of the droplet stream 901 includes at least two droplets 920A,920C with long their respective tails. One or a plurality of satellites 925A-925D may be formed between the droplets.

In FIG. 9B, the baseline in the raw brightfield still image 900A is removed forming a baseless image 900B of the droplet stream 901B. As can be seen in FIG. 9B, the background of the baseless image around the image of the droplet stream 901B is all or substantially all black pixels. The edges of the image of the droplet stream 901B are white pixels.

Next, the foreground is segmented out from the baseless image 900B forming the foreground image 900C shown in FIG. 9C with an image of the droplet stream 901C. The foreground is detected in baseless image 900B, and then background in the baseless image 900B is blanked out to form the foreground image 900C of the image of the droplet stream 901C on a blank (all white) background.

In FIG. 9D, image binarization is performed on the foreground image 900C and the image of the droplet stream 901C to form a processed image of the droplet stream 901D in a noiseless binary image 900D. Image binarization fills in the image regions and holes, and further segments pixels into black pixels and white pixels in order to remove noise pixels and form the noiseless binary image 900D with the image of the droplet stream 901D. As a result of the segmentation into black pixels and white pixels, the noiseless binary image 900D is substantially black and white. The image of the droplet stream 901D is mostly black to easily detect the edges and shapes in the image.

With the image processing completed on the raw brightfield still image 900A, computer vision can be used to detect images of droplets and satellites, then analyze the images droplets to determine (extract) features of the droplets, and determine drop morphology (e.g., jet stream, satellites, tails, drops, etc.). Droplets can be in many shapes but can generally be fit to an oval with curves, such as elliptical curves. Typically, there are cells or other particles within the droplets of sheathed sample fluid.

Morphology Analysis and Droplet Detection

Figures 10A, 10B:
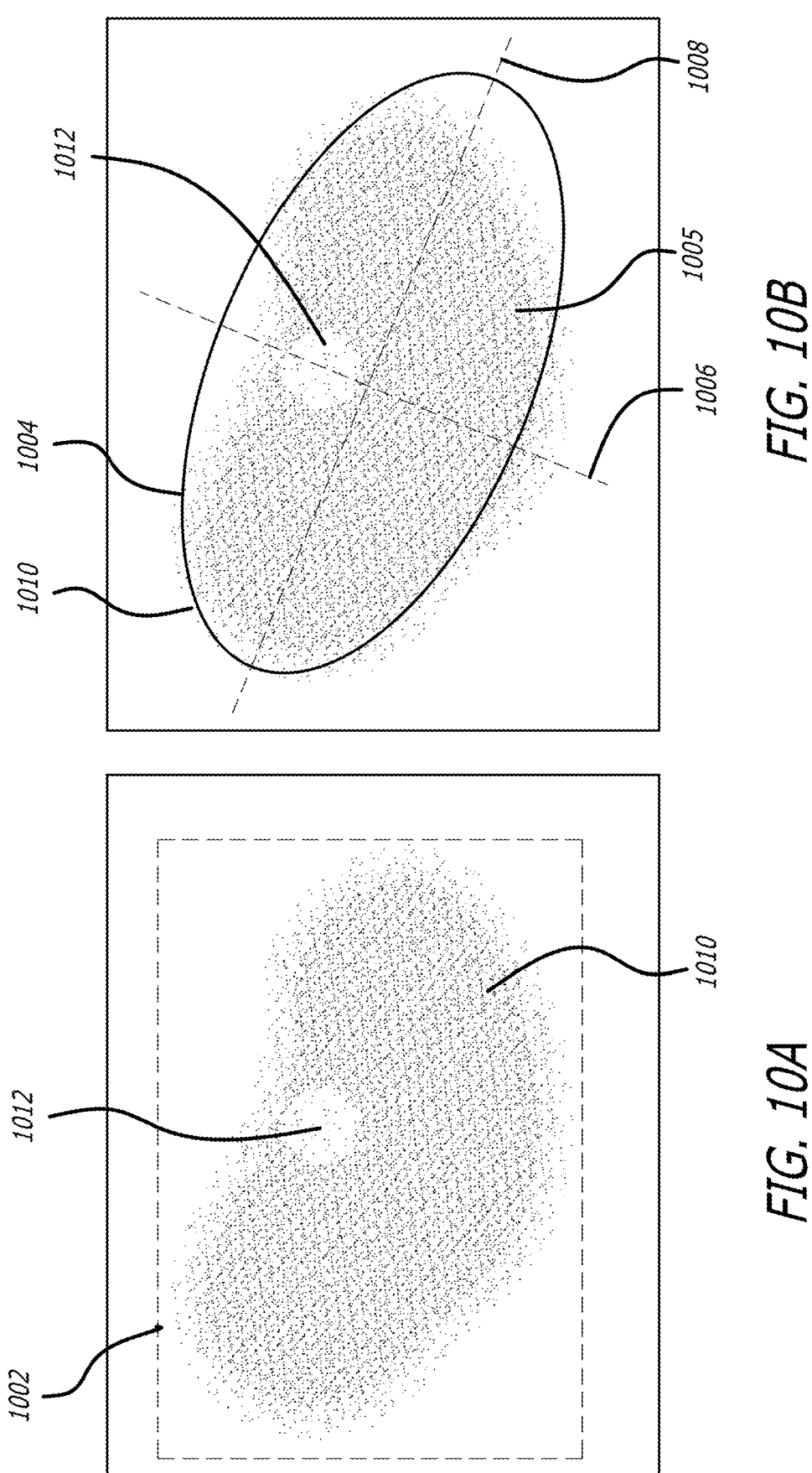
FIG. 10A is a magnified image of a droplet.
FIG. 10B is an oval fitted to the droplet for the purpose of morphological analysis of the droplet.

Referring now to FIGS. 10A-10B, the binary image of a droplet 1010, such as from the noiseless binary image 900D, is shown further magnified in order to determine (extract) features of a droplet 1010. Features of a satellite can be similarly extracted. In FIG. 10B, an oval 1004 with or without elliptical curves can be used to fit onto each droplet 1010 in the stream to extract features of area, centroid 1005 from axes 1006,1008; orientation; and circularity of a droplet 1010. In FIG. 10A, a bounding box 1002 can also be fit around the droplet 1010 to determine approximate width and height features of the droplet. Each (drop) droplet and satellite has these features that can be extracted. A jet stream has similar features that can be extracted but needs no elliptical curve fitting. The image of the droplet and the extracted features from each droplet 1010 in the image can be fed into an unsupervised or supervised machine learning algorithm or a deep learning algorithm. The extracted features represent and can be used to determine morphology of the droplets, satellites, and jet stream in the binary image and subsequently determine the location of jet breakoff, where a droplet breaks off from the jet stream.

Droplets refer to the individual liquid masses that result from the breakup of the liquid jet stream and are formed as a result of the fragmentation of the liquid column or jet. Satellites, on the other hand, are typically smaller masses that are formed during the breakup process and are typically in close proximity to a larger primary droplet. Satellites are formed as a result of secondary breakup events. When a primary droplet is formed, it may undergo further breakup into smaller masses that are often referred to as satellites. The two dimensional extracted features from the images of each jet stream, droplet, and satellite can act as a proxy for the mass.

With the extracted features and the images, a machine learning algorithm can automatically cluster the droplets and satellites into two groups based on the relative visual differences. As long as droplets and satellites appear different enough in terms of size, circularity, width, and other features, the machine learning algorithm can dichotomize them into droplets and satellites. Using machine learning is beneficial because droplets and satellites are of different sizes and appearances when different nozzles and different frequencies are used. With the extracted features and images, the unsupervised machine learning algorithm does not need absolute values of dimensions, mass, or contextual info to make a clustering decision between droplets and satellites. As long as the droplets look different than satellites, which they do, the machine learning algorithm can automatically cluster them into two separate groups.

The location of jet breakoff (jet breakoff point) from the stream and an interval between droplets (droplet interval or gap) are useful feedback in order to control the piezoelectric device and jet breakoff from the jet stream. For example, knowing a distance between the liquid jet stream up in the image and the first droplet can provide information regarding the stability of the jet breakoff point as well as the droplet rate generation. The stability of the jet breakoff point is of particular importance since the charge stream signal should be synchronous with the breakoff phenomenon. The charge algorithm for charging droplets uses this spatial info to ensure that the droplet is stably charged immediately before the droplet breaks off from the liquid jet stream. The droplet, which is charged stably and consistently, subsequently travels through the electrostatic field, thereby ensuring a precise deflection.

Jet Break-Off and Droplet Interval Feature Extraction

Referring now to FIG. 11, with the extracted features of droplets, jet stream, and any satellites from the noiseless binary image 900D of the droplet stream, an unsupervised machine learning algorithm can be used to cluster data and detect the droplets—where is the liquid jet stream, which ones are droplets, and which ones are satellites. In image 1100A, a first image processing step is performed on the noiseless binary image 900D where a computer vision algorithm identifies (finds) the connected components in the noiseless binary image of the droplet stream forming bounding boxes 1102A-1102G around the identified connected components. For example, bounding box 1102D identifies a droplet having a tail. f Then the morphological feature extraction process 1103 is performed using the image 1100A with the bounding boxes identifying the connected components. The height and width of the bounding boxes can be useful part of the feature extraction process as was explained with reference to FIG. 10A. With respect to droplets and satellites, the extracted features from fitting an oval or an ellipse are very useful as was explained with reference to FIG. 10B. The extracted features and the image 1100A can be fed into an unsupervised machine learning algorithm 1104.

The parameters of the unsupervised machine learning algorithm 1104 was previously tuned to recognize the liquid jet, droplets, and satellites in the image 1100A based on known features so that clustering of data can be performed. Similar connected components in the noisy binary image of the droplet stream are clustered together based on the extracted morphological features of the connected components. With the tuned unsupervised machine learning algorithm 1104, pixel data in the bounding boxes of the clustered image 1100B can be output as clustered data into recognized categories of droplets 1110A-1110C and satellites 1111A-1111D. The bounding boxes can be colored differently (e.g., blue and green) to show the category (droplets and satellites) of the clustered data in the clustered image 1100B.

Analysis of the stream in the clustered image 1100B can be performed from top to bottom to determine a measured jet breakoff point and a measured droplet interval. Satellites 1111A-1111D can be ignored in the droplet stream 901A when determining jet breakoff and droplet interval. The jet breakoff is the location or line of a measured jet breakoff point 1120 from the liquid jet stream 901A, a relative distance away from the nozzle (or the top point in the image). The measured jet breakoff point 1120 in the image is a feature that can be extracted based on the clustered data, the spatial data (where located in the image), and heuristics. For example, the jet breakoff point 1120 can be defined as the first location where the liquid jet stream 901A becomes discontinuous from the top as shown by the ending of the cluster bounding box 1110C in the clustered image 1100B. With the top of the image assigned a zero pixel value, the measured droplet breakoff point from the jet stream can be determined to be a Y1 pixel value.

Ignoring the satellites 925A-925B in the cluster boxes 1111C-1111D, a measured droplet interval 1122 can be determined from the beginning of the next droplet as evidenced by the top of the cluster bounding box 1110B. A measured droplet interval value can be assigned a Y2 pixel point from the zero pixel value at the top of the image. A gap value can be used as a proxy which is determined by the difference between the Y2 pixel point and the Y1 pixel point.

Figure 17:
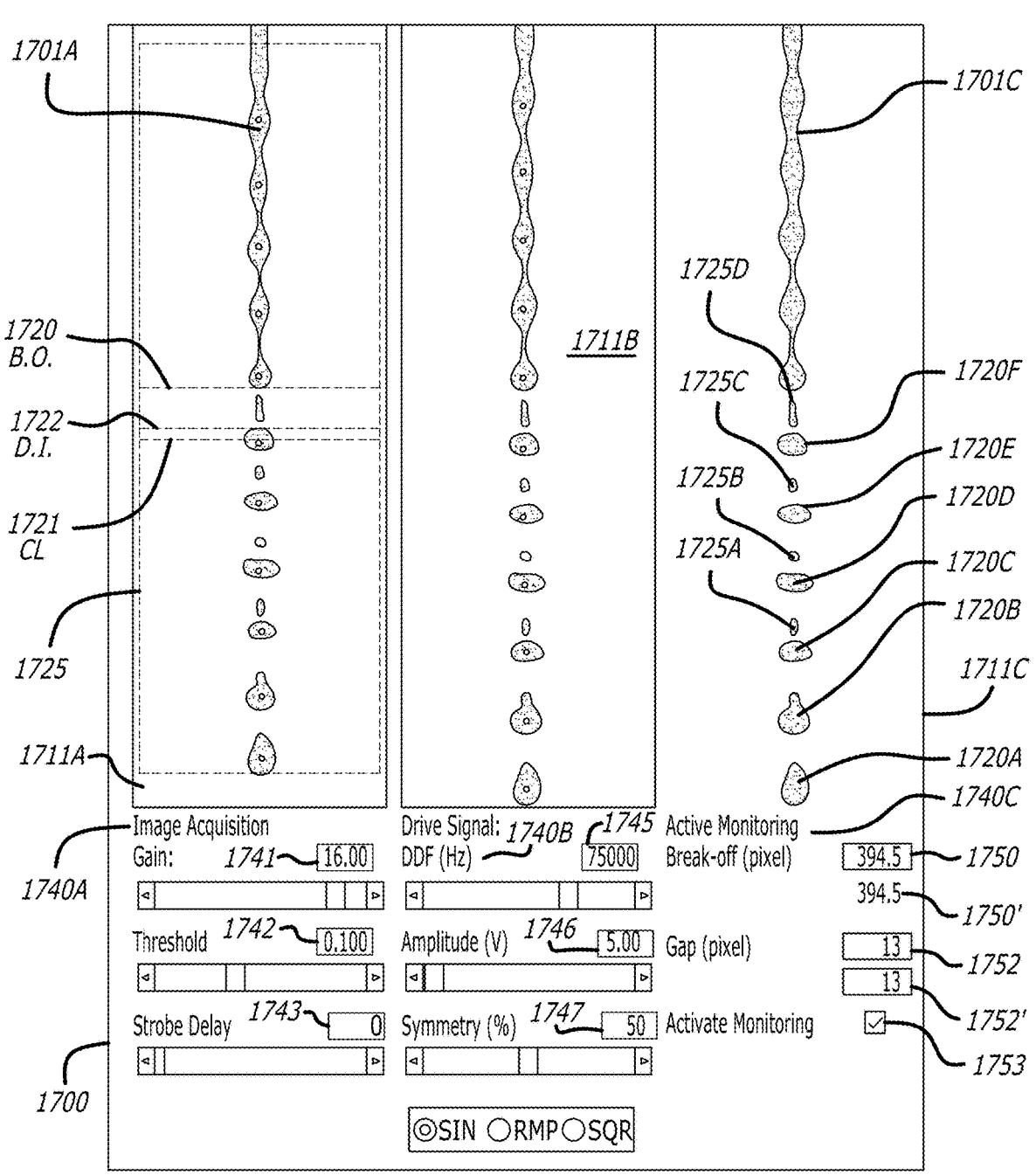
FIG. 17 is view of a user interface window for automated control of the breakoff location and droplet interval in a liquid jet stream by the droplet stream control system.

A measured droplet center point 1124 of a first droplet can also be determined from the clustered image 1100B. A measured droplet center point value can be assigned a Y3 pixel point from the zero pixel value at the top of the image. FIG. 17 illustrates a droplet center line 1721 of the first droplet in an image window 1711A of a user interface. The droplet center, indicated by the center line 1721, is a geometric centroid of the first droplet immediately after breakoff. Multiple still images are periodically captured and processed as more and more droplets in the sample droplet stream fall out of the orifice of the nozzle in the nozzle assembly.

The amplitude and frequency of a signal to the piezoelectric device around the sample tube in the flow cell can be modulated to get a selected point, location, distance of jet breakoff point 1120 and a selected point, location, or distance of droplet interval (gap) 1122. The image 1100C displays the extracted features of the breakoff line 1120' associated with a measured jet breakoff point, and the droplet interval line 1122' associated with a measured droplet interval. Image 1100C can be shown in a user interface to provide visual feedback to a user. Based on this visual feedback, a user with an input device can select a desired jet breakoff point or location in the image 1100C by selecting a pixel in the image. The user with the input device can also select a desired droplet interval in the image 1100C by selecting another pixel in the image below the first pixel that was select as the desired jet breakoff point.

Droplet Control System

A flow cytometer can generate up to a hundred thousand droplets every second for a frequency of 100 kHz. A high speed movie camera could capture droplet formation and jet breakoff if it had a speed that could generate one mega frames per second or ten mega frames per second. Instead of using an expensive super high speed video camera with a large amount of data in many frames to process, we can illuminate the droplet stream at certain points in time and capture a still image at those certain points in time. The image could be captured at certain phases in time, such as when a sinusoidal waveform of a known frequency crosses zero or crosses over another known constant value. The period between phases can be associated with the droplet interval. Instead of seeing the whole process of a droplet develop with a movie captured by a high speed movie camera, you see the image of the droplet at the time when it breaks off from the jet stream. If the flow rate remains stable, at each zero-crossing (cross-over) of different phases of a sinusoidal waveform (alternating current signal) associated with the droplet interval, a still image of each droplet breaking off can be captured. The diffused LED strobe light 211 and the hardware triggered digital camera 212 can be synchronized with the zero-crossings (crossovers) to generate a strobe light signal and a shutter trigger signal to periodically (each droplet interval) capture images of the droplet stream at the breakoff point. A sinusoidal waveform can be used as a driving signal to a piezo-electric device to vibrate the sheathed sample fluid. Other waveforms can also be used such as ramp, triangular, pulse, and square waveforms as long as they are periodical. Using this driving signal to determine the zero-crossing (cross-over) points relates the image capture process to the droplet formation.

Figure 12:
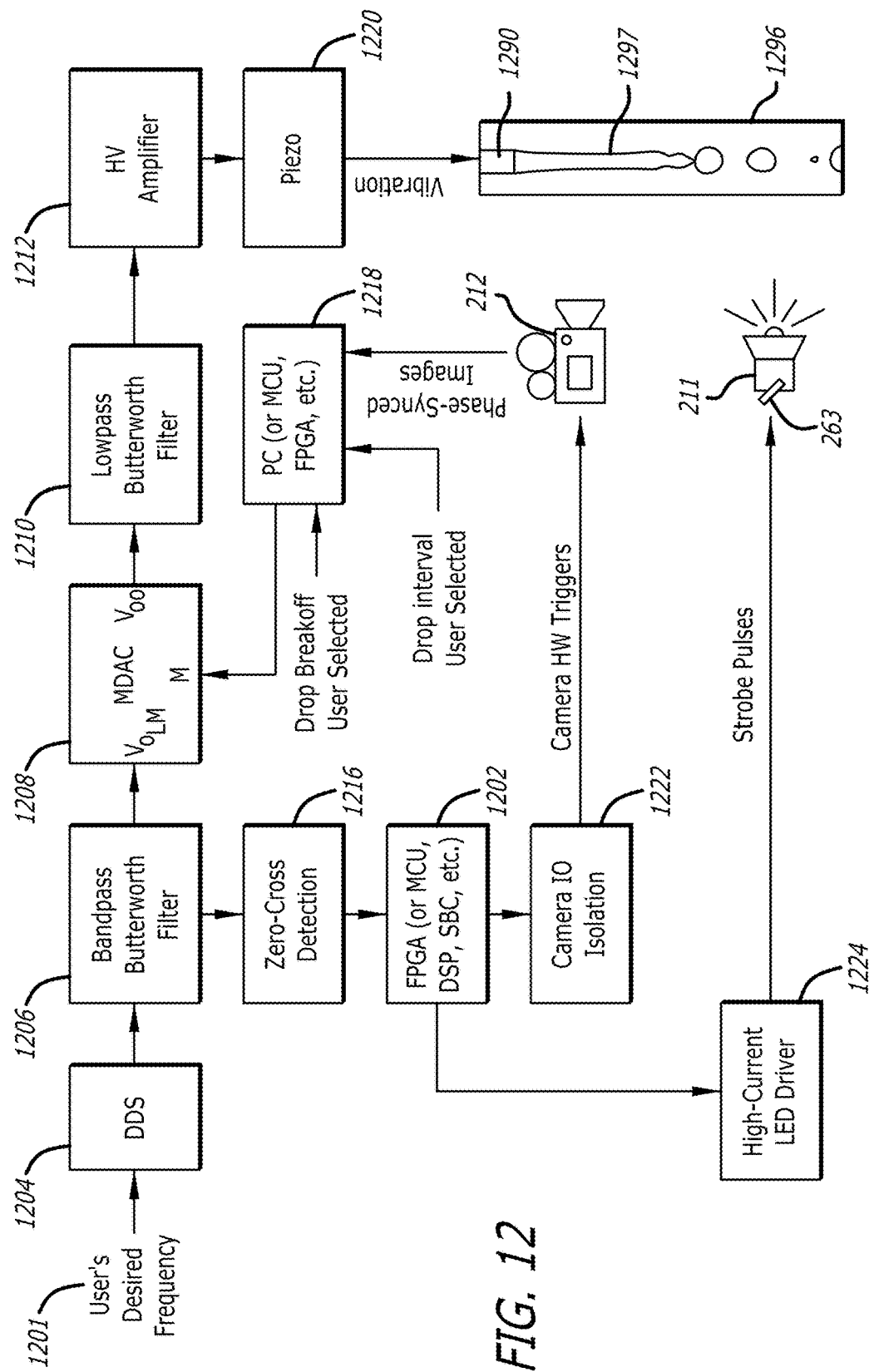
FIG. 12 is a block diagram illustrating components of a liquid jet breakoff control system.

Referring now to FIG. 12, a block diagram illustrates the structural elements in a droplet control system 1200. At the center of the droplet control system 1200 is a synchronized controller 1202 that can be formed out of logic in a field programmable gate array (FPGA), a single-board computer (SBC), an application specific integrated circuit (ASIC), or programmed by firmware/software/middleware into a microcontroller unit (MCU), a digital signal processor (DSP), or a general-purpose processor.

If some sort of a disturbance occurs in the droplet stream causing a change to the jet breakoff point (location) from that selected by a user, the controller 1202, with visual feedback of the droplet stream, can automatically compensate and bring it back to the same jet breakoff point location based on visual feedback provided by the camera, dynamic modeling, image analysis, and closed loop control. A disturbance in the droplet stream can be caused by a minor clog in a hose or nozzle, some other glitches in some component (pump, valve) in the fluidics system that is not catastrophic, temperature fluctuations, or passing of air bubbles through the fluidic system in the vicinity of the flow cell.

The droplet control system further includes a direct digital synthesizer (DDS) 1204, a bandpass Butterworth filter 1206, a multiplying digital-to-analog converter (MDAC) circuit 1208, a low-pass Butterworth filter 1210, a high voltage power amplifier 1212, a zero-cross (cross-over detector) detection circuit 1216, an image processor 1218, a camera isolation circuit 1222, and a high current LED driver circuit 1224 to generate a high current LED strobe pulse.

The high current (power) LED driver circuit 1224 couples to the diffused LED strobe light 211 via the LED electrical connector 263 to deliver strobe pulses. The camera isolation circuit 1222 couples to the hardware triggered digital camera 212 via the hardware trigger input electrical connector 478 in order to provide the hardware trigger signal into the camera in order to capture the droplet stream images. The captured droplet stream images can be shared with a controller or a computer via the camera cable 264 to analyze the still photos. In one embodiment, the camera cable is a USB cable.

The high voltage power amplifier 1212 couples to the piezoelectric crystal 1220 in order to generate vibrations into the sheathed sample and generate droplets coming out of the nozzle. The amplitude of the signals from the direct digital synthesizer (DDS) 1204 are small. Then power amplifier amplifies the amplitude of those small signals coming from the synthesizer for within a voltage and current capacity that cause the piezoelectric crystal device to vibrate.

The direct digital synthesizer (DDS) (sinusoidal signal generator) 1204 is a frequency synthesizer with a digital input to select the frequency of an analog sinusoidal signal output that is generated. Based on a user's desired input frequency 1201 from a user interface, such as that shown in FIG. 17, the frequency synthesizer 1204 generates an analog sinusoidal signal output at the desired input frequency 1201. This analog sinusoidal signal output is used as a basis to both propagate acoustic waves through the sheathed sample fluid as well as synchronize the hardware triggered digital camera 212 and diffused LED strobe light 211 to periodically capture images of the droplet stream.

The analog sinusoidal signal with the desired frequency is filtered by the bandpass Butterworth filter 1206 to remove noise and harmonics, if any, so that the signal does not form spurious zero-crossings (cross-overs). The bandpass Butterworth filter 1206 has a bandpass in a range of desired frequencies of the analog AC sinusoidal waveform signal to drive the piezo-electric device. The bandpass Butterworth filter 1206 has stop bands outside this bandpass range of desired frequencies in order to filter out harmonics thereof and any other noise sources.

The analog sinusoidal signal is coupled into the zero-cross detection circuit 1216 to determine zero-crossing (cross-over) points in the analog sinusoidal signal. The zero-crossing (cross-over) points where the sinusoid signal transitions from positive amplitude to negative amplitude or from negative amplitude to positive amplitude. A positive constant reference voltage can be used instead of a zero line at zero volts to form cross-over points in time if the amplitude in the sinusoidal signal or other AC signal is always positive. At each zero-crossing (cross-over) point, the zero-cross (cross-over) detection circuit 1216 generates very narrow pulses (zero-crossing pulses) coupled into the synchronized controller 1202.

Based on the zero-crossing pulses, the synchronized controller 1202 generates a strobe signal coupled into the LED driver circuit 1224 and a trigger signal coupled to the camera isolation circuit 1222. The LED driver circuit 1224 generates strobe pulses coupled to the diffused LED strobe light 211 to cause the momentary flash of light against the flat mirror and illuminate the droplet stream in a brightfield imaging fashion. In synchronization with the strobe light, the synchronized controller 1202 sends a hardware trigger signal through the camera isolation circuit 1222 to the hardware triggered digital camera 212 to capture a phase synched image 1296 of the droplet stream that is evenly backlit by the LED strobe light. The phase synched images 1296 of the droplet stream captured by the hardware triggered digital camera 212 are loaded into the image processor 1218. The camera isolation circuit 1222 buffers the hardware trigger signal into the hardware triggered digital camera 212.

The analog sinusoidal signal with the desired frequency is filtered by the filter 1206 and coupled into a voltage input of the MDAC circuit 1208. The MDAC circuit 1208 receives a multiplier factor (a feedback signal) from the image processor 1218 based on the images, the user selected (desired) jet breakoff point control input, the user selected (desired) droplet interval (gap) control input, and error signals from the droplet controller for jet breakoff and droplet interval. The multiplier factor adjusts the amplitude (i.e., the gain of MDAC) of the input voltage signal Vin into the output Vout of the MDAC. By changing the amplitude of the analog sinusoidal signal, based on visual feedback, the location of the jet breakoff point down from the nozzle can be automatically controlled in a feedback loop. The jet breakoff point can be raised up in the image closer to the nozzle or lowered further down from the nozzle in the image. Similarly, the droplet interval can be adjusted by modulating the sinusoidal signal amplitude by adjusting the gain of the MDAC circuit 1208.

In some cases, the MDAC circuit is a selective resistor divider ladder that reduces the voltage amplitude (gain) of the input voltage signal Vin on the output. The amplitude-compensated analog sinusoidal signal with the desired frequency is coupled into the high voltage power amplifier 1212 to drive the piezoelectric (piezo) crystal 1220 and produce acoustic waves traveling through the sheathed sample fluid that pass through the nozzle, which, in turn, cause the jet stream breakoff and create droplets and potentially satellites.

The image processor 1281 receives the phase synched images 1296 of the droplet stream captured by the hardware triggered digital camera 212. The image processor 1281 further receives the user selected jet breakoff point value and the user selected droplet interval value. The image processor 1281 performs image processing on the phase synched images 1296 to clean up the image and improve signal to noise ratio. The image of nodes can be removed. The background of the image can be eliminated. Much of the image can be smoothed out before features are extracted and machine learning analysis of droplet formation is performed. After cleaning the image, the image processor 1281 can use computer vision algorithms to extract features, obtain droplet measurements, catalog and cluster drops (droplets) from satellites, and determine measurements of the measured jet breakoff point and the measured droplet interval from the image. The measured jet breakoff point, and the measured droplet interval can be used as feedback in comparison with the user selected jet breakoff point and the user selected droplet interval to generate a jet breakoff error signal to adjust the droplet stream.

The image processor 1281 can execute a jet breakoff algorithm to determine the multiplier value (based on a jet breakoff error signal comparing desired jet breakoff point and measured jet breakoff point) for the MDAC in order to try to primarily maintain the user selected jet breakoff point. Periodically, the image processor 1281 alternates to execute a droplet interval algorithm to generate the multiplier value (based on a droplet interval error signal comparing desired droplet interval point and measured droplet interval point) for the MDAC in order to try to secondarily maintain the user selected droplet interval in the droplet stream.

The image processor 1281 can be an FPGA, an ASIC, an MCU, or personal computer that is programmed to perform the image processing, the computer vision algorithms, a jet breakoff point algorithm, and a droplet interval point algorithm.

Figure 13:
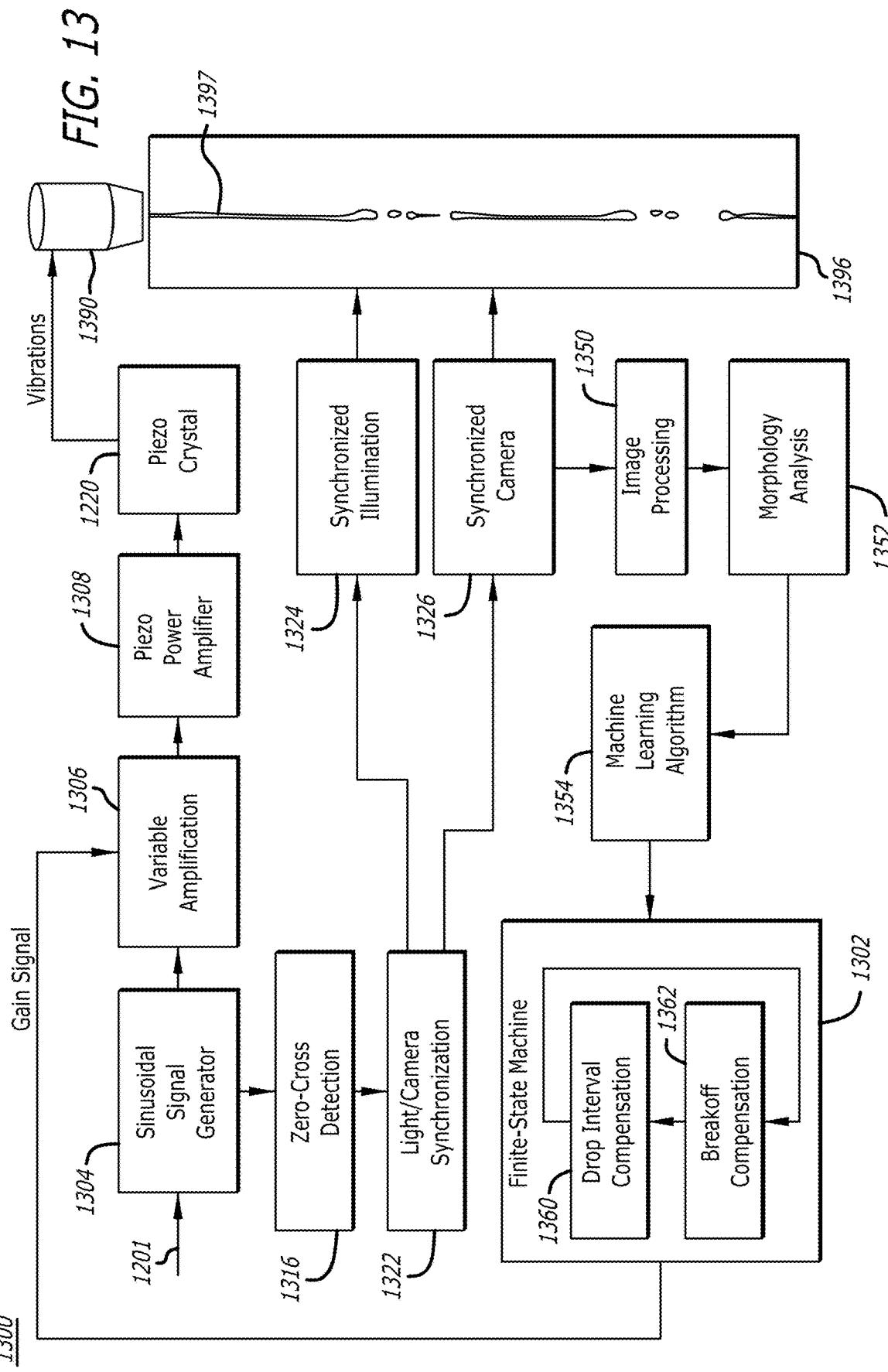
FIG. 13 is a functional block diagram of the liquid jet breakoff control system including the machine learning of a liquid jet stream image and associated feedback control of the droplet stream.

Referring now to FIG. 13, a block diagram illustrates the functional processes 1300 performed by the droplet control system 1200 for a flow cytometer or cell sorter.

Generally, the process starts with the frequency synthesizer (waveform synthesizer) or signal generator generating a sinusoidal (alternating current waveform) signal 1304 with varying direct current (DC) voltage levels at a desired oscillation frequency for a piezo crystal. The frequency synthesizer synthesizes the alternating current (AC) waveform at a selected frequency with an initial maximum or peak amplitude. The sinusoidal signal is coupled into a variable gain amplifier and a zero-cross detection circuit.

A next process is a selective amplification process 1306 for the variable gain amplifier to selectively amplify the amplitude of the sinusoidal signal from the frequency synthesizer. The variable gain amplifier receives an AC waveform signal from the synthesizer and generates a variable gain AC waveform signal (variable gain sinusoidal signal) with an amplitude that is based on a gain signal.

The next process is to increase or amplify 1308 the power levels in the sinusoidal signal from the variable gain amplifier with a high voltage power amplifier of constant gain so that it can drive the piezoelectric crystal 1220 with a desired amplitude and frequency. This results in a high voltage AC waveform signal that can be coupled into a piezoelectric crystal to cause vibrations in a tube within the flow cell.

In parallel, the next process is for the zero-cross detector to detect 1316 the times that the sinusoidal signal crosses over a constant voltage line, such as zero volts or 1 volt for example, and generate a narrow time pulse for each crossing. This results in a single bit pulse train of pulses at each crossover.

A synchronization controller receives the single bit pulse train of pulses generated by the zero-cross detector. Based on the single bit pulse train of pulses, the synchronization controller performs the next process of synchronizing and generating 1322 strobe signals for the LED strobe light and the hardware trigger or shutter signal (digital trigger signal) for the hardware triggered camera.

Based on the synchronized signals, the LED strobe light provides synchronized illumination 1324 for the droplet stream 1397 of the flow cytometer/cell sorter. Based on the synchronized signals, the hardware triggered camera captures synchronized images 1396 of the droplet stream 1397. The synchronized images 1396 provide a form of visual feedback for the system. The synchronized images 1396 of the droplet stream are coupled into the image processor.

The image processor initially performs imaging processing steps 1350 on the synchronized images 1396 of the droplet stream 1397. The imaging processing steps 1350 include baseline removal, foreground segmentation, and image binarization as described with reference to FIGS. 9A-9D, and 11. The image processor then performs morphology analysis 1352 on the image of the droplet stream to extract features from the image as was described with reference to FIGS. 10A-10B and 11. The image and extracted features are then input into a machine learning algorithm.

The image processor executes the machine learning algorithm 1354 as was described with reference to FIG. 11. Initially, a machine learning algorithm performs a clustering process 1354C on the droplet stream image that clusters the droplets together separate from the satellites in the image. This is so the satellites can be ignored in the droplet stream between droplets in further processing steps. Then, the image processor executes a further machine learning algorithm with the clustered droplets. The machine learning algorithm performs a first determination process 1354D1 that determines a measured breakoff point as a number of pixels from the top of a synchronized image 1396 of the droplet stream. The machine learning algorithm further preforms a second determination process 1354D2 that determines a measured droplet interval or gap as the number of pixels down from the measured breakoff point. The measured droplet interval (gap) point and the measured breakoff point from the synchronized image 1396 are coupled into a finite state machine 1302 executed by the image processor. The finite state machine generally includes two controllers to alternately generate a gain signal that is fed back into the variable amplification process and set the amplification of the analog sinusoidal signal.

One unsupervised machine learning algorithm that can be used for clustering of droplets and satellites is a k-means clustering algorithm, but other unsupervised algorithms can be used, as well AI deep learning algorithms. The benefit of an unsupervised machine learning algorithm over a supervised one is that unsupervised is a label-free method and does not require training of the algorithm with labeled data. Training is a time consuming, and expensive stage of data analysis done in an offline fashion prior to the deployment of algorithms for real time analysis.

Generally, the finite state machine 1302 generates the gain signal (multiplier signal) that is coupled into the variable gain amplifier (multiplying DAC) to perform the selective amplification process 1306 of the amplitude for the sinusoidal signal. The finite state machine has two states, a breakoff compensation state 1362 and a droplet interval compensation state 1360 that can use two independent controllers and control logic. The digital value of the gain signal determines the amount of amplification to apply to the sinusoidal signal to compensate for error between the measured and desired jet breakoff point for the breakoff compensation state 1362. By changing the vibration amplitude of the piezo-electric on the droplet stream, the gain signal can alter the jet breakoff point. The digital value of the gain signal also determines the amount of amplification to apply to the sinusoidal signal to compensate for error between the measured and desired drop interval (gap) point for the droplet interval compensation state 1360. Changing the vibration amplitude of the piezo-electric on the droplet stream, i.e., the gain signal, alters the droplet interval as well. The state machine 1302 switches states between the droplet interval compensation state 1360 and the breakoff compensation state 1362. Compensation of the breakoff point to maintain the desired, target, or selected jet breakoff point is prioritized over the compensation of the droplet interval when the actual or measured breakoff point is far away (more than one droplet distance) from the target or selected breakoff point set by the user.

As soon as the actual or measured breakoff point approaches the selected or target breakoff point and lies within one droplet distance, the finite state machine switches states to the droplet interval compensation state 1360 and the control system accordingly compensates gain of the variable gain amplifier to compensate for error in the droplet interval. This state is kept as active until the measured jet breakoff point moves outside the one-drop distance to the selected jet breakoff point, at which point the finite state machine switches back to breakoff control state.

During the breakoff compensation state 1362, the image processor compares the measured jet breakoff point determined from an image of the droplet stream with the desired jet breakoff point input from a user interface to determine a difference or an error value in the breakoff point. The drop breakoff point error value is used to generate the digital gain signal and compensate for the difference or error value. For example, if the measured jet breakoff point is 400 pixels and the desired jet breakoff point is 280 pixels, the gain signal is increased to further amplify the sinusoidal signal and increase the vibrations in the sample tube so that the jet breakoff point occurs earlier where droplets breakoff closer to the top of the image 1396. As another example, if the measured jet breakoff point is two hundred (200) pixels and the desired jet breakoff point is 280 pixels, the gain signal is decreased to lower the amplification in the sinusoidal signal and decrease the vibrations in the sample tube so that the jet breakoff point occurs later where droplets breakoff further away from the top of the synchronized image 1396.

During the droplet interval compensation state 1360, the image processor compares the measured droplet interval point determined from the image of the droplet stream with the desired droplet interval point input from a user interface to determine a difference or an error value in the droplet interval. The droplet interval point error value is used to generate the digital gain signal and compensate for the difference or error value. For example, if the measured droplet interval is 10 pixels and the desired droplet interval point is 13 pixels down from the breakoff point, the gain signal is increased to further amplify the sinusoidal signal and increase the vibrations exerted on the sheathed sample liquid so that droplet interval becomes smaller in the synchronized images 1396. As another example, if the measured droplet interval point is 16 pixels and the desired droplet interval point is 13 pixels, the gain signal is decreased to lower the amplification in the sinusoidal signal and decrease the vibrations so that additional pixels are added to the droplet interval moving the first droplet further away from the breakoff point in the synchronized images 1396. Generally, over a range of values, the relationship between the amplitude of the sinusoidal signal and the droplet interval is linear. That is, the higher the amplitude of the sinusoidal signal the larger is the droplet interval.

Startup of the droplet control system to the desired frequency, jet breakoff point, and droplet interval is important. The desired frequency is set by a user/operator in the beginning along with the choice of nozzle and its orifice. The frequency synthesizer generates the frequency of the AC signal, which is held constant during the jet breakoff regulation process and the droplet interval regulation process, by the control system. During the jet breakoff regulation process and the droplet interval regulation process, the synchronized controller in the control system modulates the amplitude of the AC signal (associated with the gain of the MDAC) to vary the jet breakoff point and the droplet interval point.

Figure 14:
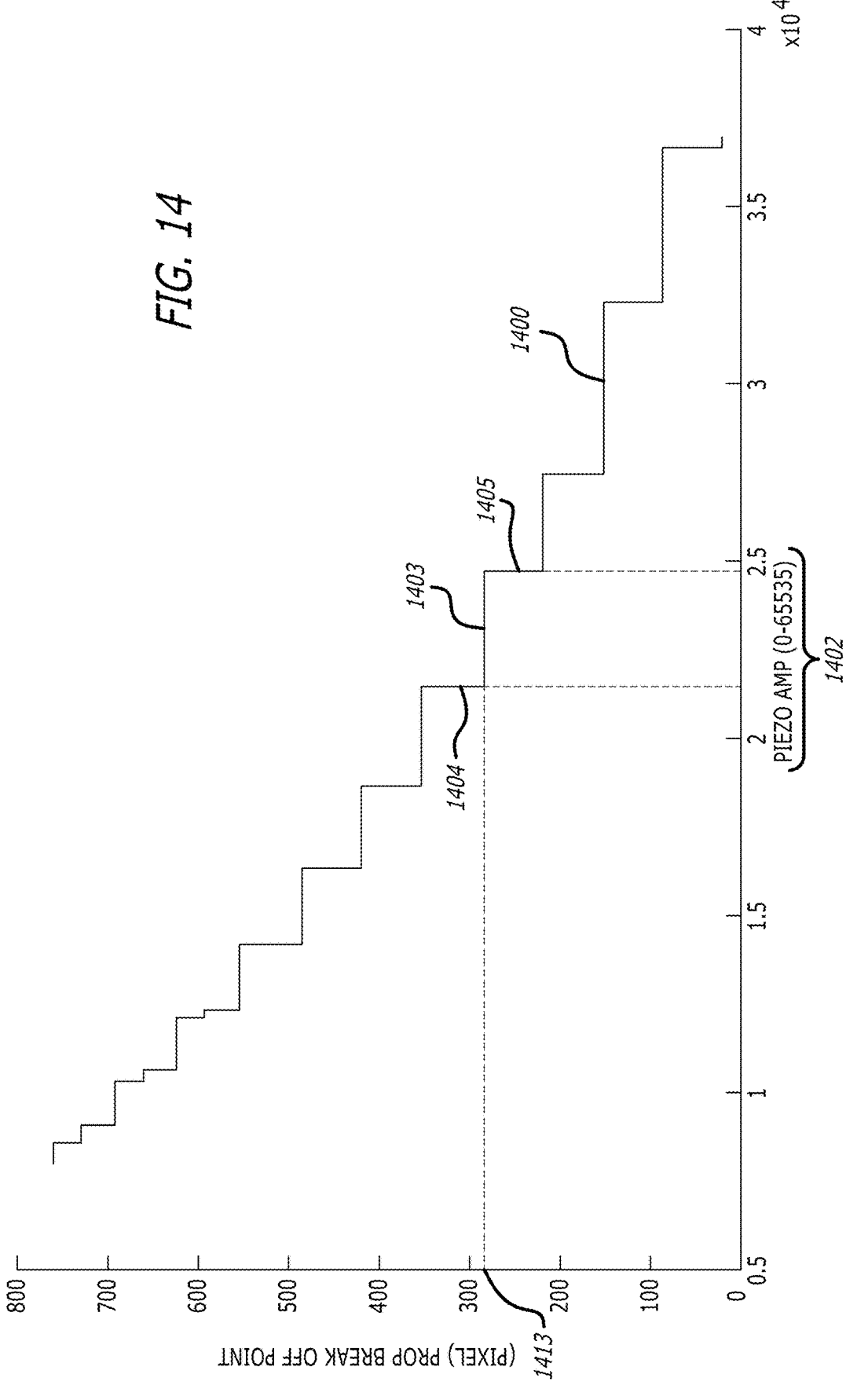
FIG. 14 is a chart of a waveform for open-loop control of a gain setting for a variable amplifier to generate a signal for a piezo-elector device to generate vibrations and acoustic waves into the sheathed sample fluid and form a jet breakoff point for the droplet stream.

FIG. 14 is a chart of a response 1400 for the jet breakoff point algorithm. The response 1400 is a plot between the jet breakoff point (pixels) along the Y axis versus oscillation amplitude out of the piezo amplifier along the X axis that drives the piezo device. The higher the oscillation amplitude, the smaller is the jet breakoff point value (the farther-up the breakoff point is in the image of the droplet stream) in pixel number. The lower the oscillation amplitude of the signal out of the piezo amplifier, the larger is the jet breakoff point value (the farther-down the breakoff point is in the image of the droplet stream) in pixel number. The response 1400 is a staircase response moving from one level to another over an oscillation amplitude range for the output signal from the piezo amplifier driving the piezo device. Over the oscillation amplitude range 1402, the response 1400 is fairly constant at a pixel value 1413 between a rising edge 1404 and a falling edge 1405 associated with the lower and upper oscillation amplitude of the range. That is, for the pixel value 1413, the oscillation amplitude can vary in the oscillation amplitude range 1402 in order to compensate for the droplet interval value using the droplet interval control algorithm and the droplet interval algorithm response 1500 shown in FIG. 15. That is, the oscillation amplitude range 1402 can be associated with the oscillation amplitude range 1502 shown in FIG. 15, for example. Based on the desired amplitude along the X axis and the desired breakoff point on the Y axis, gain for the MDAC in the droplet control system can be set with the response 1400 in the breakoff interval compensation state upon startup.

Figure 15:
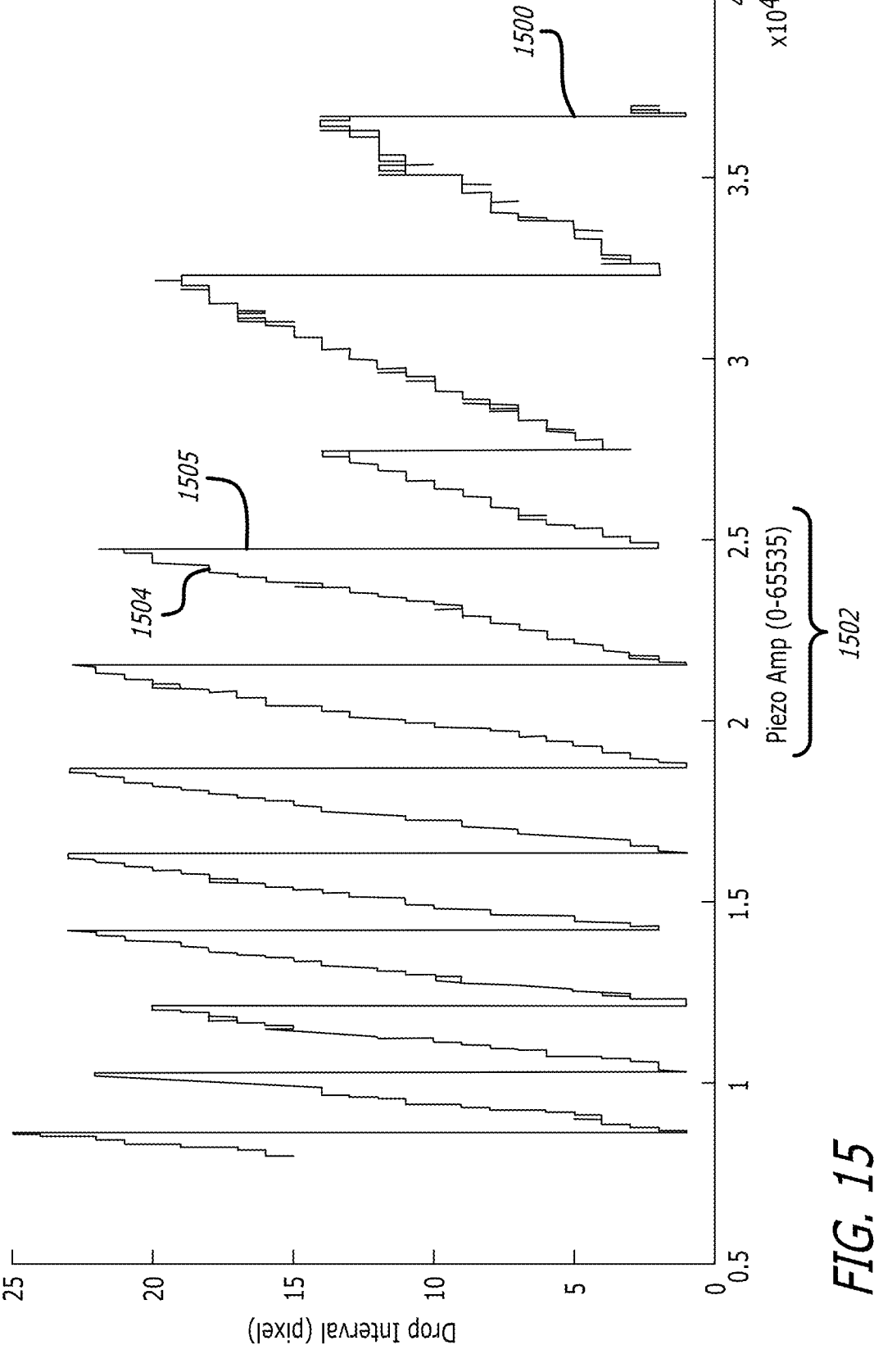
FIG. 15 is a chart of a waveform for open-loop control of a gain setting for a variable amplifier to generate a signal for a piezoelectric actuator to generate vibrations and acoustic waves into the sample fluid and form a droplet interval point for the droplet stream.

FIG. 15 is a chart of droplet interval algorithm response 1500 between the droplet interval point (pixels) versus oscillation amplitude of the signal output by the piezo amplifier driving the piezo device. The response 1500 has a varying sawtooth shape with each tooth being in a different range of oscillation amplitude. Each tooth has a positive edge with a gradual upslope and a negative edge having a sharp slope to reset to the base of next tooth and the next range of frequencies. Generally, as the oscillation amplitude of the signal output from the piezo amplifier becomes greater, the upslope of the leading edge of a tooth becomes more gradual so that the adjustment in the droplet interval requires larger amplitude adjustment. In one period, the droplet interval starts near zero pixels and then increases as the oscillation amplitude increases until a maximum value is reached. At the maximum value of droplet interval for a given amplitude range, the droplet interval response quickly jumps to near zero value of droplet interval for the next tooth in the next frequency range. Based on the desired amplitude along the X axis and the desired droplet interval on the Y axis, gain for the MDAC in the droplet control system can be set with the response 1500 in the droplet interval compensation state upon startup.

Upon startup, the synchronized controller 1202 can use both the response 1400 and the droplet interval point algorithm shown by the response 1500 to set the initial gain for the MDAC and, thereby, the amplitude of the sinusoidal signal that is used to drive the piezo electric device and synchronization of the strobe light and camera to capture the phase synchronized images of the droplet stream.

Referring now to FIG. 17, a droplet stream graphical user interface (GUI) 1700 generated by a processor (graphics processor) is shown displayed by a display device 1799 of a computer coupled to the flow cytometer or a display device 1799 directly coupled the flow cytometer. With the user interface 1700, a user can set the jet breakoff point (location) and the droplet interval value (gap) in the image of the droplet stream. For example, in the user interface 1700 shown in FIG. 17, the value of the jet breakoff point is set to 394.5 pixels and the gap (droplet interval point) is set to 13 pixels from the jet breakoff point, for example.

The graphical user interface (GUI) 1700 includes three droplet stream image windows 1711A-1711C. The image window 1711A displays the jet breakoff point line 1720 and the droplet interval line 1722 associated with the breakoff point value (pixels) and the droplet interval or gap value (pixels) set by the user. The image window 1711A further displays a droplet center line 1721 of the first droplet off the stream 1701A of droplets. The image window 1711A further displays a bounding box 1725 around the desired set of objects within the image magnified in the 1711B image.

The image in the image window 1711B shows the magnified version of whatever region is selected by a bounding box 1725.

The image window 1711C is the noiseless binary image that is fully processed with the imaging processing and ready to be processed with the steps of the computer vision algorithm. In the image window 1711C, the stream 1701C has a plurality of droplets 1720A-1720F and a plurality of satellites 1725A-1725D.

Below the three droplet stream image windows 1711A-1711C, the graphical user interface further includes a plurality of control input windows 1740A-1740C to set some initial settings. The image acquisition control input window 1740A includes a gain control input 1741, a threshold level input 1742, and a strobe delay input 1743. The gain control input 1741 for image acquisition is by a slider or plus and minus buttons in the graphical user interface to receive user input. The gain control input 1741 sets the gain of the camera and is used for image processing to amplify the signal in the image of the droplet stream for formation of the brightfield still image. The threshold level input 1742 for image acquisition also has a slider and plus and minus buttons to receive user input. The threshold level input 1742 is for the binarization threshold used by the image processing algorithm and is set by the user. The strobe delay input 1743 for image acquisition is to adjust the synchronization of the strobe signal for the LED Strobe light versus the hardware shutter trigger signal (digital trigger signal) for the camera.

The drive signal control input window 1740B is for controlling the initial setting of a drive signal for the piezo crystal to vibrate a tube in the flow cell in aligning cells in the generation of drops. The control inputs to the drive signal control input window 1740B includes a drop drive frequency (DDF) input (Hertz) 1745, an amplitude input (volts) 1746, and a symmetry input (percentage) 1747. The drop drive frequency (DDF) input (Hertz) 1745 for drive signal control can be input by a slider or plus and minus buttons. The drop drive frequency (DDF) input (Hertz) 1745 sets the frequency of the frequency synthesizer that sets the frequency of the vibrations of the piezo-electric device for droplet formation. The amplitude input (volts) 1746 manually sets the amplitude of the drive signal for the piezo-electric device that can fine tune the vibrations of the piezo-electric device for droplet formation. The symmetry input (percentage) 1747 for drive signal control can also be input by a slider or plus and minus buttons. The symmetry input (percentage) 1747 varies between 0% and 100% is for controlling the skewedness of the periodic drive signal. Typically, the symmetry input is set to 50%.

The active monitoring control input window 1740C includes a user selected jet breakoff point control input (pixels) 1750, a user selected droplet interval or gap control input (pixels) 1752, and a user selected activate monitoring control box 1753. The pixel values for the breakoff control input (pixels) 1750 and the droplet interval or gap control input (pixels) 1752 can be typed into data input fields. To activate monitoring, an activate monitoring control box 1753 is checked by the user with an input device such as a mouse or in the case the display device is a touch screen, touched by the user by a finger. The breakoff control input (pixels) 1750 is for setting the jet breakoff point. The droplet interval or gap control input (pixels) 1752 is for setting the droplet interval that is below the jet breakoff point. Below the input fields is a display of the current measured values for jet breakoff 1750' and droplet interval (gap) 1752'.

FIGS. 18A-18D illustrate charts of waveforms for the control signals generated in response to the control inputs over time and the measured jet breakoff point, droplet interval point, and droplet center point over time.

Figures 18A, 18B, 18C, 18D:
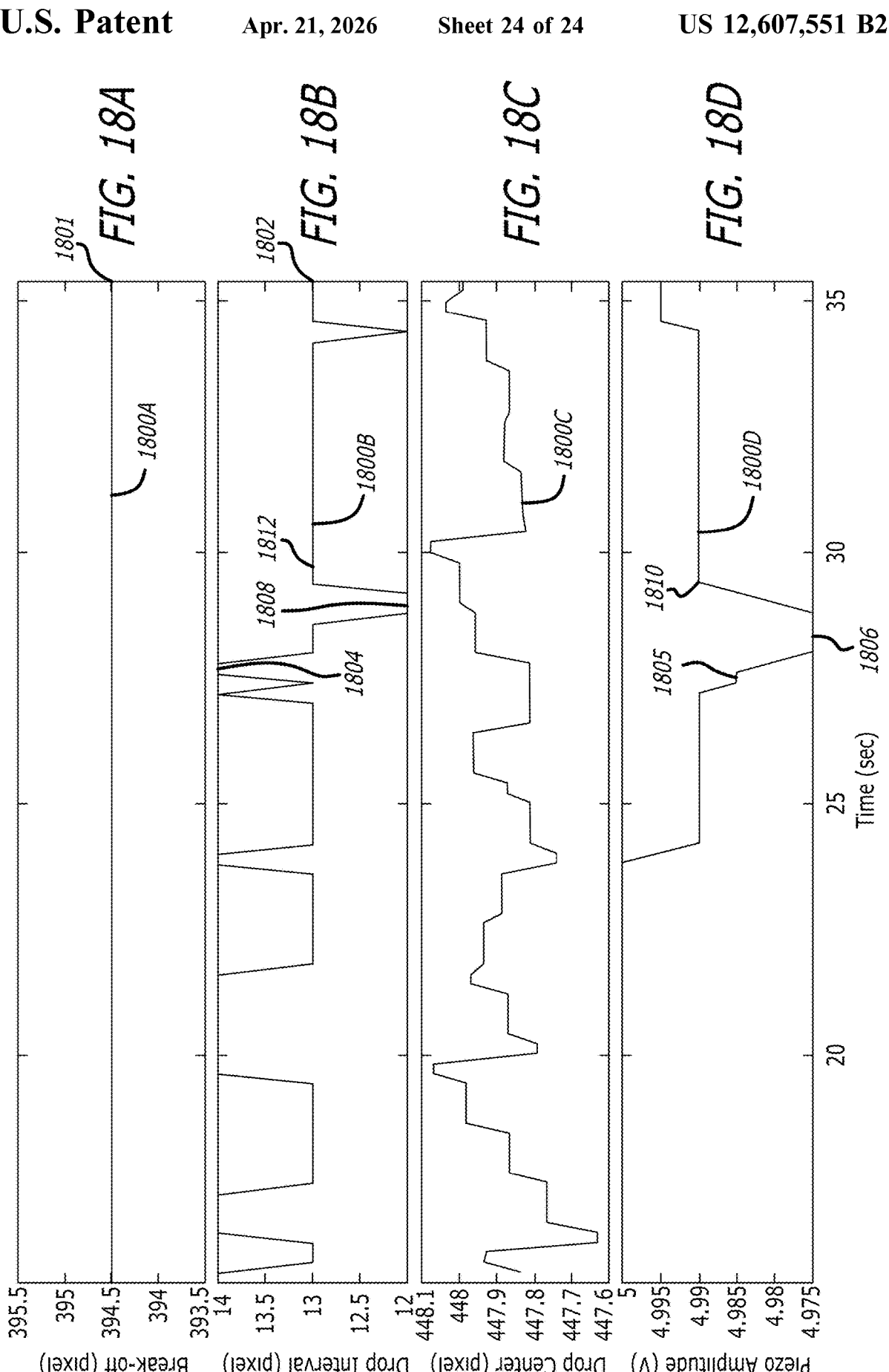

FIG. 18D is a chart of a waveform 1800D for the piezo amplitude for the piezo driver signal over time. The piezo amplitude is a voltage amplitude value over time. In the waveform 1800D, the control generates the piezo amplitude for the piezo driver over time to either maintain (i) a measured droplet interval as close to the user selected droplet interval setpoint as possible, or (ii) a measured jet breakoff point close to the user selected jet breakoff setpoint as possible.

FIG. 18A is a chart of a waveform 1800A for the breakoff point over time. The breakoff point can be the pixel number along the Y axis of an image of the stream. In this case, the synchronized controller 1202 in the droplet control system 1200 is properly maintaining a selected constant value for the jet breakoff point. Because the measured jet breakoff point is within one-drop distance from a set point 1801, the user selected jet breakoff point, the controller can be used instead to control the droplet interval and correct for error between measured droplet interval and user selected droplet interval.

FIG. 18B is a chart of a waveform 1800B for the droplet interval point over time. The droplet interval point can be the pixel number along the Y axis of the image of the stream. In the waveform 1800B, the measured droplet interval point varies over time from a set point 1802, the user selected droplet interval point. Around point 1804 in the waveform 1800B, the measured droplet interval increases over the set point 1802. The control system compensates by reducing the piezo amplitude to point 1805 and then point 1806 in the waveform 1800D. But the piezo amplitude at point 1806 is too low resulting in a measured droplet interval point 1808 in waveform 1800B. To compensate further, the controller increases the piezo amplitude to point 1810 in the waveform 1800D and the droplet interval increases to point 1812 in the waveform 1800B.

FIG. 18C is a chart of a waveform 1800C for the measured droplet center point over time. The measured droplet center point can be the pixel number along the Y axis of the image of the stream. In the waveform 1800C, the measured droplet center point varies over time while the breakoff is maintained at a constant. The measured droplet center point of the first droplet can be determined by calculating the geometric centroid of a filled blob corresponding to the first droplet.

Advantages

There are a number of advantages to the disclosed embodiments. The LED strobe light includes a diffuser to form a more uniform backlight of the droplet stream to capture better images over a longer vertical distance. The LED strobe light and hardware triggered camera are synchronized to each other and to the droplet formation so they can capture better images of the droplet stream. With consistently better images, drop morphology analysis can be performed by machine learning to determine a jet breakoff point, a droplet interval point, and a droplet center point from the images of the droplet stream. With values of the jet breakoff point and the droplet interval point being periodically measured, a droplet control system can be used to provide real time control to user selected values and improve the operation of a flow cytometer/cell sorter system.

When implemented in software, the elements of the embodiments of the invention are essentially the code segments to perform the necessary tasks. The program or code segments can be stored in a processor readable medium to be read out by a processor for execution. The code segments can be downloaded into a processor readable medium via computer networks such as the Internet, Intranet, etc. Alternatively, the code segments can be transmitted from the processor readable medium by a computer data signal embodied in a carrier wave over a transmission medium or communication link to a processor for execution. The processor readable medium may include any medium that can store information. Examples of the processor readable storage medium include an electronic circuit, a semiconductor memory device, a random access memory (RAM), a read only memory (ROM), a flash memory, an erasable programmable read only memory (EPROM), a floppy diskette, a CD-ROM, an optical disk, a magnetic hard disk, etc.

This disclosure contemplates other embodiments or purposes. It will be appreciated that the embodiments of the invention can be practiced by other means than that of the described embodiments, which are presented in this description for purposes of illustration and not of limitation. The specification and drawings are not intended to limit the exclusionary scope of this patent document. It is noted that various equivalents for the particular embodiments discussed in this description may be practiced by the claimed invention as well. That is, while specific embodiments have been described, it is evident that many alternatives, modifications, permutations and variations will become apparent in light of the foregoing description. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, it is intended that the claimed invention embrace all such alternatives, modifications and variations as fall within the scope of the appended claims. The fact that a product, process, or method exhibits differences from one or more of the described exemplary embodiments does not mean that the product or process is outside the scope (literal scope and/or other legally-recognized scope) of the following claims.

What is claimed is:

1. A flow cytometer or cell sorter system, the system comprising:

a fluidics system under pressure to cause a sheath fluid and a sample fluid with cells or particles to flow;

a flow cell assembly coupled in communication with the fluidics system to receive the sheath fluid and the sample fluid, the flow cell assembly including a flow cell body to surround the sample fluid with the sheath fluid to form a sheathed sample fluid, wherein the flow cell body has a base with a circular opening to allow a stream of the sheathed sample fluid to flow out and subsequently form a droplet stream along a fluid axis;

a center bracket coupled to the flow cell body of the flow cell assembly;

a flat mirror mounted to the center bracket below and in parallel with a backside of the flow cell body;

a hardware triggered camera on one side of the flow cell body coupled to the center bracket, the hardware triggered camera pointed at the flat mirror on a first angle with a plane surface of the flat mirror; and a diffused light emitting diode (LED) strobe light on an opposite side of the flow cell body coupled to the center bracket, the diffused LED strobe light pointed at the flat mirror on a second angle with the plane surface of the flat mirror;

wherein an activation of the diffused LED strobe light generates a diffused strobe light into the flat mirror backlighting the droplet stream that is synchronized with a triggering of the hardware triggered camera to periodically capture a brightfield still image of a portion of the droplet stream along the fluid axis below the flow cell body.

2. The system of claim 1, wherein:

the synchronization of the activation of the diffused LED strobe light and the triggering of the hardware triggered camera is in time with different phases of an alternating current (AC) signal that drives a piezo-electric device to vibrate and cause the sample fluid to form one or more droplets in the droplet stream.

3. The system of claim 1, wherein:

the flow cell assembly further includes:

a cuvette below the base of the flow cell body, the cuvette having a flow channel to receive the stream of the sheathed sample fluid, and a nozzle assembly below the cuvette, the nozzle assembly having a nozzle with an orifice to receive the stream of the sheathed sample fluid and form the droplet stream;

and the flat mirror is mounted to the center bracket such that it is below the cuvette and the nozzle assembly with the plane surface of the flat mirror parallel with the fluid axis of the droplet stream.

4. The system of claim 1, further comprising:

a first mounting bracket coupled to and between the hardware triggered camera and the center bracket; and a second mounting bracket coupled to and between the diffused LED strobe light and the center bracket.

5. The system of claim 1, wherein:

the diffused LED strobe light includes:

a plurality of infrared (IR) light emitting diodes all of which are coupled to a digital strobe signal to be activated and deactivated to form a strobe light, and an optical diffuser mounted in front of the plurality of infrared (IR) light emitting diodes to receive the strobe light and form the diffused strobe light directed into the flat mirror;

and the hardware triggered camera includes:

a camera chip coupled to a digital trigger signal, the camera chip having a plurality of camera pixels and a global shutter, wherein the global shutter is responsive to the digital trigger signal to begin and end image capture by the plurality of camera pixels.

6. The system of claim 4, wherein:

the diffused LED strobe light includes:

a plurality of infrared (IR) light emitting diodes all of which are coupled to a digital strobe signal to be activated and deactivated to form a strobe light, and an optical diffuser mounted in front of the plurality of light emitting diodes to receive the strobe light and form the diffused strobe light directed into the flat mirror; and the hardware triggered camera includes:

a camera chip coupled to a digital trigger signal, the camera chip having a plurality of camera pixels in an active area and a global shutter to capture pixel data concurrently in parallel from the plurality of camera pixels, the global shutter responsive to the digital trigger signal to begin and end image capture by the plurality of camera pixels.

7. The system of claim 6, wherein:

the diffused LED strobe light further includes:

a printed circuit board coupled to the plurality of infrared light emitting diodes, the printed circuit board having a connector to receive the digital strobe signal and one or more metal traces to couple the digital strobe signal to the plurality of infrared light emitting diodes; and a hollow housing with a hollow reflective chamber, the hollow housing having a first end to receive the optical diffuser and the printed circuit board, the hollow housing having a second end to couple to the second mounting bracket;

wherein the hollow reflective chamber reflects the diffused strobe light from the first end to the second end of the hollow housing and out toward the flat mirror.

8. The system of claim 6, wherein:

the hardware triggered camera further includes:

a front enclosure coupled to the first mounting bracket, the front enclosure having an opening;

a printed circuit board coupled to the camera chip, the printed circuit board having a first connector to receive the digital trigger signal and one or more metal traces to couple the digital trigger signal to the camera chip, the printed circuit board having a second connector to couple to a processor to receive still images captured by the camera chip;

a camera body coupled to the printed circuit board;

one or more lenses coupled to the camera body and inserted through the opening of the front enclosure, the one or more lenses held in alignment over the camera chip to focus the droplet stream onto the active area of the camera chip; and a back enclosure coupled to the camera body and the front enclosure to enclose the printed circuit board and couple the camera body to the first mounting bracket.

9. The system of claim 8, wherein:

the first mounting bracket includes an opening to receive a side scatter camera.

10. The system of claim 1, wherein the flow cell assembly further includes:

a drop drive assembly including a sample injection tube (SIT), the sample injection tube coupled in communication with the fluidics system to receive the sample fluid;

a flow cell body around the drop drive assembly to receive the sample fluid from the sample injection tube, the flow cell body coupled in communication with the fluidics system to receive the sheath fluid, the flow cell body having a funnel portion to surround the sample fluid with the sheath fluid to form the sheathed sample fluid streaming out of an opening;

a cuvette coupled to a base of the flow cell body, the cuvette having a channel to receive the sheathed sample fluid streaming out of the opening, the cuvette being transparent to light and allowing the sheathed sample fluid to undergo interrogation in the channel by a plurality of different lasers to determine a plurality of different types of cells or particles therein; and a nozzle assembly selectively engaged with the cuvette, the nozzle assembly having a nozzle and an O-ring around the nozzle selectively pressed against a face of the cuvette around the channel, the nozzle having an orifice to receive the sheathed sample fluid from the cuvette and form the droplet stream of the sheathed sample fluid out of the nozzle assembly.

11. The system of claim 1, wherein:

the flat mirror is behind the droplet stream along the fluid axis, and the diffused strobe light is reflected off the flat mirror into the droplet stream towards the hardware triggered camera.

12. The system of claim 11, wherein:

an optical axis of the diffused LED strobe light intersects a vertical axis along the plane surface of the flat mirror; and the vertical axis along the plane surface of the flat mirror is offset from the fluid axis.

13. The system of claim 12, wherein:

an optical axis of the hardware triggered camera intersects the vertical axis along the plane surface of the flat mirror.

14. The system of claim 13, wherein:

the optical axis of the hardware triggered camera intersects the fluid axis.

15. The system of claim 13, wherein:

the first angle and the second angle with the plane surface of the flat mirror are equivalent.

16. The system of claim 6, wherein:

the first angle and the second angle with the plane surface of the flat mirror are inequivalent.

17. The system of claim 6, wherein:

the optical diffuser is framed by a frame.

18. The system of claim 1, wherein:

the droplet stream along the fluid axis includes a jet stream and a plurality of droplets.

19. The system of claim 18, wherein:

the droplet stream along the fluid axis further includes one or more satellites.

* * * * *